(12) United States Patent
Miao et al.

(10) Patent No.: US 11,503,472 B2
(45) Date of Patent: Nov. 15, 2022

(54) FAKE BASE STATION DETECTION

(71) Applicant: Apple Inc., Cupertino, CA (US)

(72) Inventors: Qiang Miao, Beijing (CN); Yaoqi Yan, Beijing (CN); Zhiwei Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 16/614,787

(22) PCT Filed: May 31, 2017

(86) PCT No.: PCT/CN2017/086652
§ 371 (c)(1),
(2) Date: Nov. 18, 2019

(87) PCT Pub. No.: WO2018/218518
PCT Pub. Date: Dec. 6, 2018

(65) Prior Publication Data
US 2020/0162925 A1 May 21, 2020

(51) Int. Cl.
*H04W 12/122* (2021.01)
*H04W 12/60* (2021.01)
*H04W 12/108* (2021.01)

(52) U.S. Cl.
CPC ....... *H04W 12/122* (2021.01); *H04W 12/108* (2021.01); *H04W 12/66* (2021.01)

(58) Field of Classification Search
CPC . H04W 12/122; H04W 12/108; H04W 12/66; H04W 12/12; H04W 12/61
See application file for complete search history.

(56) References Cited

U.S. PATENT DOCUMENTS

| 7,336,670 B1* | 2/2008 | Calhoun | H04L 63/14 |
| | | | 370/252 |
| 10,129,283 B1 | 11/2018 | Briggs et al. | |
| 2001/0034233 A1* | 10/2001 | Tiedemann, Jr. | H04W 36/30 |
| | | | 455/442 |
| 2006/0223446 A1* | 10/2006 | Dominique | H04W 52/241 |
| | | | 455/69 |

(Continued)

FOREIGN PATENT DOCUMENTS

| CN | 104244250 A | 12/2014 |
| CN | 105451232 A | 3/2016 |

(Continued)

OTHER PUBLICATIONS

Chouchane et al., "Defending against Rogue Base Station Attacks using Wavelet Based Fingerprinting", May 2009, IEEE/ACS International Conference on Computer Systems and Applications, pp. 523-530 (Year: 2009).*

(Continued)

*Primary Examiner* — Kenneth W Chang
(74) *Attorney, Agent, or Firm* — Dickinson Wright RLLP

(57) ABSTRACT

A mobile device collects received information and processes it. In some instances, the mobile device detects, based on the collected information, that a base station is likely not legitimate, i.e., it is likely a fake base station, and the mobile device bars communication with the base station for a time. In some embodiments, the mobile device determines, based on the received information, that the base station is a genuine base station. When the mobile device determines that the base station is a genuine base station or the mobile device does not determine that it is likely the base station is a fake base station, the mobile device allows or continues communication with the base station.

17 Claims, 13 Drawing Sheets

(56) References Cited

U.S. PATENT DOCUMENTS

| | | | |
|---|---|---|---|
| 2007/0079376 A1 | 4/2007 | Robert et al. | |
| 2011/0151796 A1* | 6/2011 | Walby | H04W 12/12 |
| | | | 455/67.7 |
| 2012/0027064 A1* | 2/2012 | Gupta | H04L 27/2647 |
| | | | 375/224 |
| 2013/0023286 A1 | 1/2013 | Soma et al. | |
| 2013/0344844 A1* | 12/2013 | Goldfarb | H04W 12/125 |
| | | | 455/411 |
| 2014/0128003 A1 | 5/2014 | Takahashi | |
| 2015/0140997 A1* | 5/2015 | Goldfarb | H04W 48/16 |
| | | | 455/424 |
| 2016/0309332 A1* | 10/2016 | Norrman | H04W 24/08 |
| 2016/0381545 A1 | 12/2016 | Wang et al. | |
| 2017/0311165 A1* | 10/2017 | Kang | H04W 48/16 |
| 2018/0351975 A1 | 12/2018 | Briggs et al. | |

FOREIGN PATENT DOCUMENTS

| | | |
|---|---|---|
| CN | 105744526 A | 7/2016 |
| CN | 105873067 A | 8/2016 |
| CN | 105959954 A | 9/2016 |
| EP | 1783997 A1 | 5/2007 |
| EP | 1860858 A1 | 11/2007 |
| JP | 2006174173 A | 6/2006 |
| WO | 2009031972 A1 | 3/2009 |
| WO | 2016096836 A1 | 6/2016 |

OTHER PUBLICATIONS

Shaik et al.; Practical Attacks Against Privacy and Availability in 4G/LTE Mobile Communication Systems; Available from the Cornell University Library at https://arxiv.org/pdf/1510.07563; Feb. 11, 2016; 16 pages.

International Patent Application No. PCT/CN2017/086652—International Search Report and the Written Opinion dated Feb. 22, 2018.

Chinese Patent Application No. 201780091376 X—First Office Action dated Sep. 16, 2022.

* cited by examiner

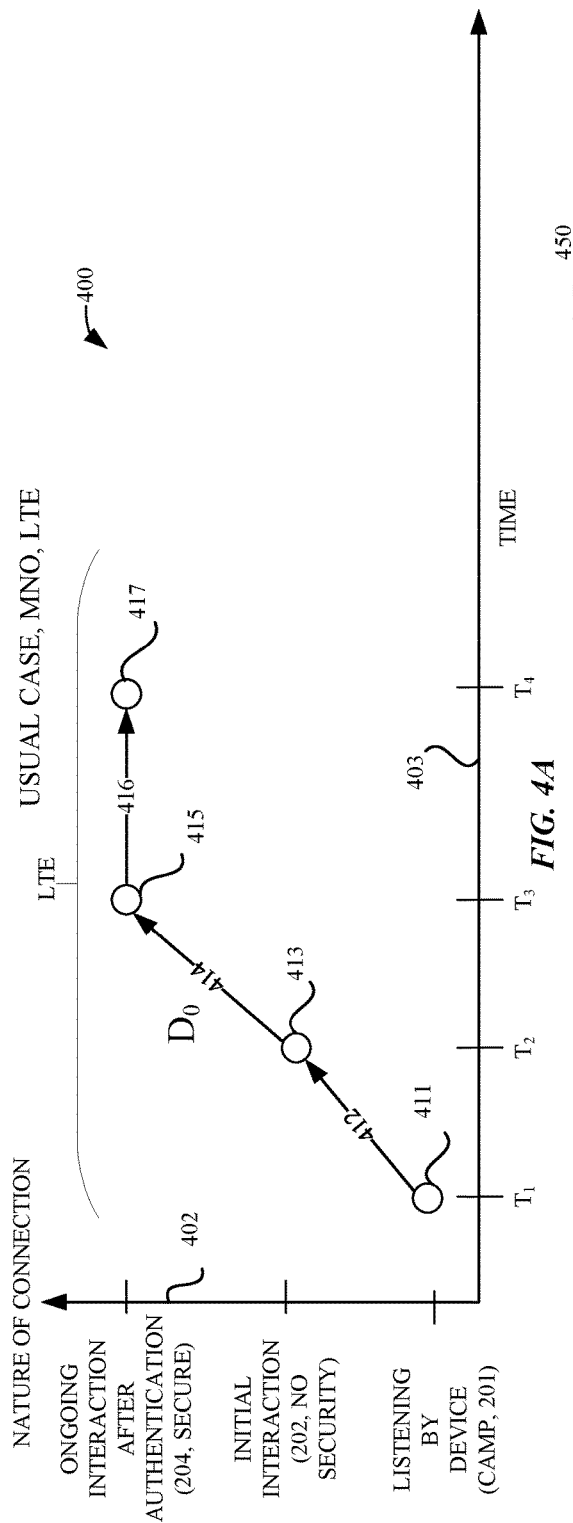
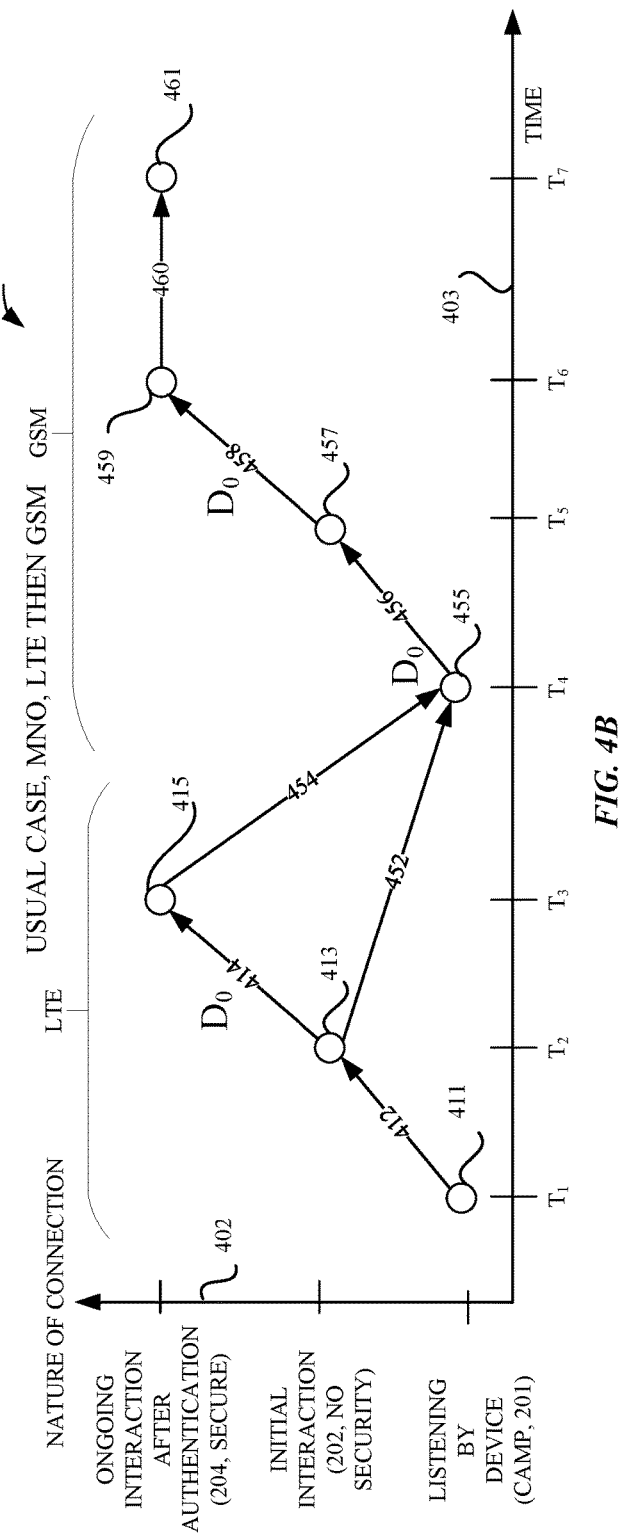
FIG. 4A
FIG. 4B

FAKE BASE STATION DETECTION

CROSS-REFERENCE TO RELATED APPLICATIONS

This Application is a national stage entry under 35 U.S.C. 371(c) of and claims priority to International Application No. PCT/CN2017/086652 filed May 31, 2017, entitled "FAKE BASE STATION DETECTION," and published as International Publication No. WO2018/218518A1 on Dec. 6, 2018, which is incorporated by reference herein in its entirety for all purposes.

FIELD

The described embodiments relate generally to multiple access wireless communications using electronic devices, including systems and techniques for analyzing signaling messages from a base station and determining whether the base station may be a fake base station sending sham messages.

BACKGROUND

Security and privacy of a user of a wireless device may be attacked by a malicious party. One class of attacks is based on the malicious party placing a piece of radio equipment out in the public where a legitimate mobile network operator (MNO) is providing services. The equipment placed or in the control of the malicious party transmits signals which appear to be legitimate base station signals. Such a piece of radio equipment is referred to herein as a fake base station, and the malicious party is referred to as a faking operator. A wireless device, also called a user equipment (UE), may place some trust in the signals from the fake base station and proceed to attempt to establish or maintain communications using the fake base station. The fake base station may send a sham message to the wireless device. Serious problems can occur if a user of the wireless device mistakenly understands the sham message as being a genuine message routed via a legitimate MNO. A user may also be referred to as a subscriber herein.

The Third Generation Partnership Project (3GPP) standards development organization has developed and continues to develop a set of standards referred to as Long Term Evolution (LTE). Some embodiments disclosed herein are illustrated with respect to the 3GPP LTE standards. Further details of LTE standards can be found in i) 3GPP 36.213 v14.2.0, March 2017, "Physical layer procedures," (hereinafter "3GPP 36.213"), ii) 3GPP 36.212 v14.2.0, March 2017, "Multiplexing and channel coding," (hereinafter "3GPP 36.212"), iii) 3GPP 36.211 v14.2.0, March 2017, "Physical channels and modulation," (hereinafter "3GPP 36.211"), iv) 3GPP 36.321, March 2017, "Medium Access Control (MAC) protocol specification," (hereinafter "3GPP 36.321"), v) 3GPP 36.331, March 2017, "Radio Resource Control (RRC) Protocol Specification," (hereinafter "3GPP 36.331"), vi) 3GPP TS 24.301, "Non-Access-Stratum (NAS) protocol for Evolved Packet System (EPS) (Release 14) (hereinafter "3GPP 24.301"), and vii) 3GPP 36.300 v14.1.0, "Overall Description," December, 2012, (hereinafter "3GPP 36.300").

A wireless device performing the LTE standards can be considered to have radio resource control (RRC) states such as RRC_IDLE and RRC_CONNECTED. LTE RRC states are described in 3GPP 36.331. Authentication (security) in an LTE network is hosted by a mobility management entity (MME). The role of the MME is discussed in 3GPP 36.300.

A base station in an LTE system is generally referred to as an eNodeB. Thus, a fake base station in an LTE system may be referred to as a fake eNodeB.

Another standard referred to in this application is Global System for Mobile Communications (GSM). Some details of GSM can be found in the following GSM standards documents: i) 3GPP TS 04.08, March, 2003, "Mobile radio interface layer 3 specification (Release 1998)," (hereinafter "3GPP 04.08"), ii) 3GPP TS 24.008 v14.3.0, March, 2017, "Mobile radio interface Layer 3 specification, Core network protocols, (Release 14)," (hereinafter "3GPP TS 24.008"), iii) 3GPP TS 24.011 v14.0.0, March, 2017, "Point-to-Point (PP) Short Message Service (SMS) support on mobile radio interface (Release 14)," (hereinafter "3GPP 24.011"), iv) 3GPP TS 23.040 v14.0.0, March, 2017, "Technical Realization of the Short Message Service (SMS) (Release 14)," (hereinafter "3GPP 23.040"), and v) ETSI TS 100.522 v7.1.0, "Network Architecture (GSM 03.02 version 7.1.0 Release 1998), January, 2000 (hereinafter "GSM 03.02").

One application of the Short Message Service (SMS) is to send text messages. The Short Message Service provides ways to transfer messages between a GSM device and a recipient via a Service Center (further details in 3GPP 24.011 and 3GPP 23.040). For example, one user of a mobile device may send to another user a character string representing a user message. Other forms of information other than text strings can also be sent, for example, pictures and URL links. Routing of SMS messages is supported by a network server called an SMS service center ("SMS-SC"). An overview of SMS can be found in 3GPP 24.011. A discussion of the network components, including an SMS-SC, used to support SMS can be found in 3GPP 23.040.

Authentication in a GSM network is hosted by an authentication center (AuC). The role of the AuC is discussed in GSM 03.02.

A wireless device can be considered to have various radio resource (RR) and mobility management (MM) states in GSM. RR and MM states are discussed in 3GPP 04.08 and 3GPP 24.008.

In general, a base station tower may be used by an MNO to operate one or more sectors, using directional antennas. A common arrangement is to use antennas with a 120 degree beam pattern and maintain three sectors from a single tower at a given frequency band. From the point of view of the MNO, a cell is a geographic region served by one base station or one sector. The signals observed in that geographic region, from the point of view of a UE, may be referred to as a cell. An operator may deploy a system that supports more than one radio access technology (RAT). For example, a wireless device in a given geographic region may be able to use two or more of LTE, UMTS, and/or GSM. The same radio tower may be equipped with antennas to support two or more RATs. For example, the same radio tower may have both LTE and GSM equipment installed on it. An operator will generally perform some kind of load balancing to serve the demanded load in a given geographic area. For example, an operator may intend that a new call begin with an LTE base station rather than a GSM base station, depending on the instantaneous traffic loads on the respective LTE and GSM systems in that geographic area.

SUMMARY

Representative embodiments set forth herein disclose various systems and techniques for detecting a fake base station.

Fake base stations are a problem and this application describes methods and devices for detecting fake base stations.

A fake base station may try to deliver a sham message to a wireless device for a user to read. The faking operator that has deployed the fake base station generally does not have authentication equipment and does not have packet service equipment. Also, the faking operator is not concerned with system capacity and so may transmit system information that makes the fake base station appear to be very good for camping to a scanning wireless device even if the radio channel from the wireless device to the fake base station is weak. In contrast, the MNO is interested in serving as many subscribers as possible with acceptable service. The MNO generally practices load balancing and does not attempt to induce a scanning wireless device to camp on a given genuine base station with poor signal conditions between the wireless device and the given genuine base station. Thus, there are frequently marked differences between system information from a fake base station and system information from a genuine base station.

This application describes how a wireless device can detect a fake base station by processing collected signature components. The signature components, in some embodiments, are based on, but are not limited to: i) observed system information, ii) signaling messages, iii) text message data, and/or iv) unusual text message delivery events. Some signature components, when present, provide a conclusive indication that an observed base station is genuine (not fake).

In addition, in some embodiments, the signature components are based on, but are not limited to: i) the nature of various connection aspects such as whether system information from the base station is oriented toward inducing a wireless device to camp on the base station, ii) a security aspect, iii) an availability of packet service aspect, iv) an unusual configuration of system information and/or v) signaling messages indicating very few radio channel frequency numbers to be used for scanning.

This application provides a signature-based approach for classifying a base station as fake and in some instances of determining conclusively that a base station is genuine. Signature components are collected by observation and can be evaluated using a combining technique based on weights and thresholds. In various embodiments, if the fake signature threshold is exceeded, access using the observed base station is barred for a time. If a conclusive indication is observed, a base station is considered to be genuine.

Fake base stations share some characteristics in common with genuine base stations, this is necessary in order for a mobile device to exchange messages with the fake base station. Traits of a fake base station are sought in observations while the mobile station still does not know if it is observing a genuine base station or a fake base station. A record of traits is remembered and then analyzed later to estimate whether a base station is likely a fake base station.

Example traits of fake base station include, but are not limited to: i) the observed base station is very inviting to attach to, ii) the observed base station seems to be sending nonsense on the paging channel, iii) the observed base station does not support packet data service, iv) the observed base station refuses a rudimentary request from the mobile station, v) the observed base station seems to only support an extremely low number of radio frequency carriers, or vi) the observed base station does not seem to know the correct date and/or the correct time.

In some instances, a faking operator may use two fake base stations to reach a goal of delivering a sham message to a user of a wireless device. One fake base station may be a fake LTE base station and the other a fake GSM base station. As a wireless device communicates, in some instances, with an LTE base station and then with a GSM base station (and in some instances finally receiving a user message), this application teaches how to collect signature components and classify the base stations so that a probability of a user being presented with a sham message is reduced. Genuine base stations are recognized so that a flow of genuine messages to the user is not broken.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 2C includes an event of an LTE communication transitioning to a GSM communication. An exemplary instance of detecting a fake GSM base station is illustrated, according to some embodiments.

FIG. 4A illustrates a time series evolution of an LTE connection including ongoing interaction after authentication (a conclusive indication, $D_0$), according to some embodiments.

FIG. 4B illustrates a time series evolution of an LTE connection followed by a GSM connection, including ongoing interaction after authentication (including a conclusive indication $D_0$), according to some embodiments.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The MNO

Figure 1:
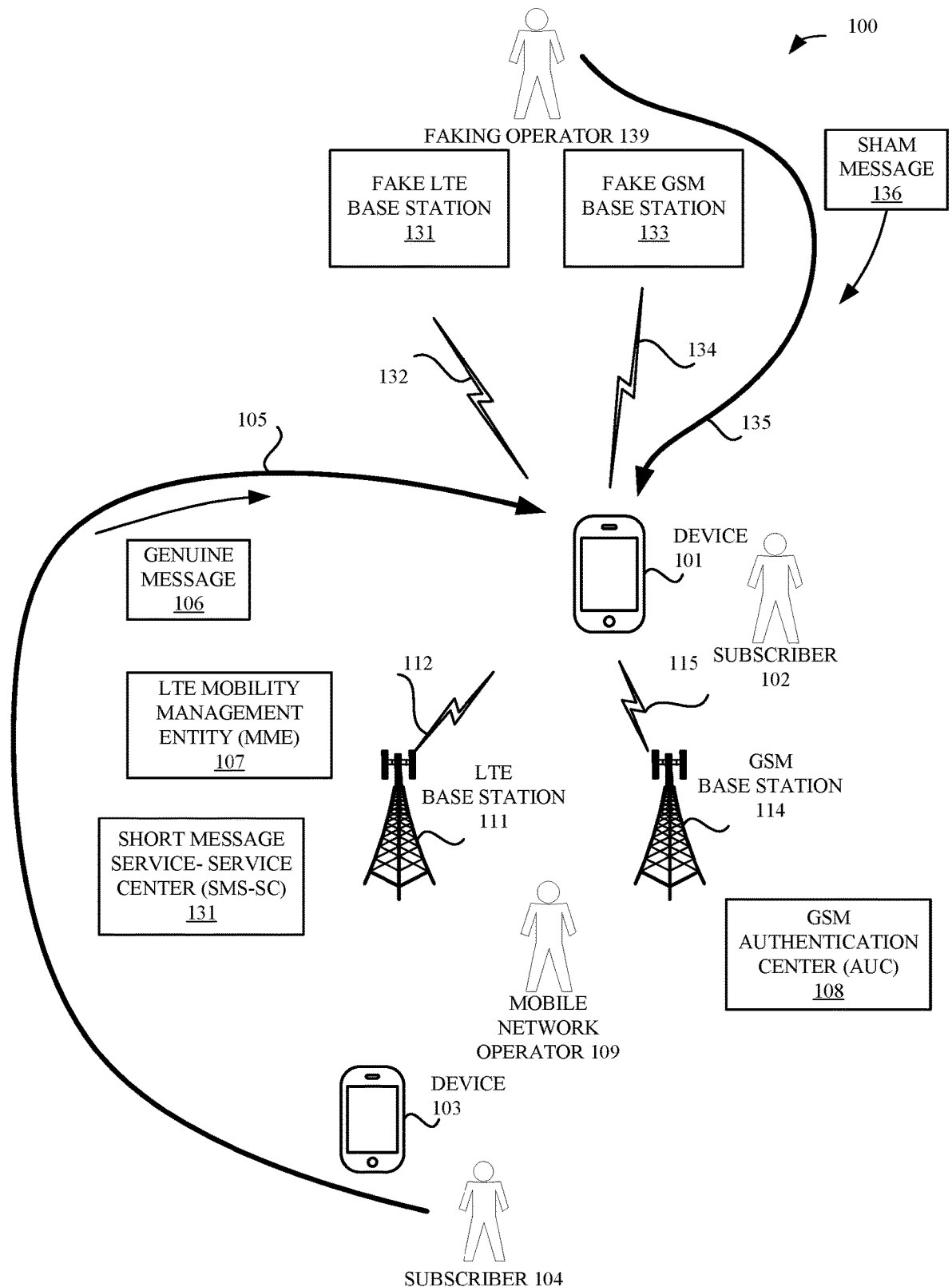
FIG. 1 illustrates an exemplary system including subscribers, devices, authentication entities, and MNO base stations, according to some embodiments. Also illustrated are fake base stations and a faking operator.

FIG. 1 illustrates a device 101 in a system 100. The device 101 is used by a subscriber 102. An MNO operator 109 (the person-figure represents a company) operates a collection of base stations including LTE base station 111 and GSM base station 114. In some instances the LTE and GSM systems are operated by different MNOs. Authentication (security) for communications via LTE base station 111 is supported by MME 107. Authentication for GSM base stations is hosted by AuC 108. MME 107 and AuC 108 may be distinct hardware servers or their functionality may be implemented on the same server.

To contrast with fake or counterfeit network equipment, the LTE base station 111 and GSM base station 114, are identified herein as examples of genuine base stations. Genuine has the same meaning as legitimate. "Fake" corresponds to the terms "counterfeit," "sham, and "untrustworthy" (implying an intention to deceive an observer). "Genuine" corresponds to the terms "real," "legitimate," and "trustworthy" (implying honesty, simplicity, and transparency).

MNO 109 is in the business of supporting thousands or millions of subscribers to generate revenue. To reach this high system capacity, MNO 109 tunes and adjusts information sent in LTE master information blocks (MIBs) and LTE system information blocks (SIBs) so that a large number of subscribers are able to simultaneously attach and make good use of the base stations of MNO 109. A device first listens to a base station (camps) to obtain system information. If the device finds radio conditions are consistent with requirements in a SIB, such as q-RxLevMin (see SIB2 in 3GPP 36.331), then the device may transition to a radio resource connected state using the particular base station in order to carry out communications. Further details of signals observed during camping (RRC_IDLE state) are provided in 3GPP 36.211. Details of device timing, frequency, and cell ID acquisition can be found in 3GPP 36.213. To maintain good connection quality, MNO 109 supports reselection mechanisms such as handoff (reselection to a base station with a better signal). Identifying a base station with a better signal is done by scanning.

MNO 109 has a large financial basis to deploy many base stations and services, such as packet service connecting with servers on the Internet. MNO 109 is in the business of providing confidentiality of the identities of the subscribers and confidentiality of the messages that they are sending. MNO 109 provides this security using secret keys, which are administered by, e.g., MME 107 and AuC 108.

To serve the many subscribers, MNO 109 supports hand-off of on-going data connections from one base station to another and from one RAT to another RAT.

SMS communications from a subscriber 104 using a device 103 are supported by an SMS-SC 131. SMS-SC 131 may be associated with the network to which device 103 is attached or associated with the network or networks of MNO 109.

In FIG. 1, device 101 may communicate with radio links 112 and 115 to the LTE base station 111 and the GSM base station 114, respectively. Device 101 can begin communication with the LTE base station 111 using a RACH sequence. A typical RACH sequence includes four messages: i) Msg1—preamble, sent by the device, ii) Msg2—RACH Response (RAR), sent by the base station, iii) Msg3—RRC Connection Request, and iv) a Connection Resolution message sent by the base station. Further details of RACH are given in 3GPP 36.211. Further description of channels used for communication, including PUSCH and PDSCH, also can be found in 3GPP 36.211.

Thus, MNO 109 provides a way for the device 101 to obtain good call quality, security, packet services, text messaging, and handoff.

The Faking Operator

FIG. 1 also illustrates a faking operator 139 operating a fake LTE base station 131 as well as a fake GSM base station 133.

In some instances, the faking operator 139 deploys a fake GSM base station without a nearby fake LTE base station. Embodiments presented herein evaluate system information from each base station camped on. In some instances, a device camps on a genuine LTE base station, receives a release message, scans and camps on a fake GSM base station. Using embodiments presented herein, the device is able to recognize the fake GSM base station even though the initial base station, the genuine LTE base station, was not fake.

The goal of the faking operator 139 is to deliver a sham message, e.g., sham message 136, to the device 101 to be presented to the subscriber 102. Sham means the same thing as counterfeit or fake. Via such a sham message, the faking operator 139 may obtain some illegal benefit such as tricking subscriber 102 into revealing something secret to the faking operator 139, e.g., a bank PIN code. The faking operator may create sham message 136 so that the source of the sham message 136 appears to be a financial institution such as a bank or another trusted entity, such as an MNO.

The faking operator may send a SIB1 from fake LTE base station 131 with an q-RxLevMin value adjusted to make fake LTE base station attractive to the device 101. The faking operator 139 may want to induce the device 101 to attempt communication through the fake LTE base station 131 so that the faking operator 139 can push the device 101 over to the fake GSM base station 133 and deliver the sham message 136 to the device 101 for the subscriber 102 to read. To achieve these steps, the faking operator 139 may choose system information to be broadcast by the fake LTE base station 131 so that when the device 101 scans for available channels, the device 101 is likely to pick fake LTE base station 131 for radio resource attachment. Similarly, the fake operator 139 may have the fake GSM base station send system information so that when the device 101 is scanning GSM frequencies, the device 101 finds fake GSM base station 133 favorable for establishing an RR connection.

System information block one (SIB1) includes fields used to calculate serving cell quality, or "S-criterion". The fake base station 131 may adjust SIB1 values such as q-RxLevMin so that device 101 can camp on the fake base station 131 more easily. Further details of master and system information blocks are given in 3GPP 36.331.

Preventing Presentation of a Sham Message

This application describes how to detect what the fake operator 139 is doing and prevent presentation of the sham message 136 to the subscriber 102. In this way, the probability of harm to the subscriber 102 is reduced.

In a genuine system, the traffic of devices seeking service is shared among the base stations in order to serve as many subscribers as possible. The MNO operator 109 wants to distribute loading, thus it does not want a busy genuine base station to service an additional particular subscriber if another genuine base station is not so busy and can instead provide satisfactory service to the additional particular subscriber.

The faking operator 139 does not have access to the secret keys of device 101. Also the faking operator 139 does not have access to the secret keys of MNO 109. The faking operator 139 is unable to perform security functions such as authentication and key agreement (AKA). Also, the faking operator 139 may not have commercial-grade SMS-SC equipment, so some SMS-SC related message aspects may be incorrect. Also, the faking operator 139 generally does not support user packet data traffic, e.g., user Internet traffic. Finally, the faking operator 139 does not have much radio equipment. A faking operator may only support a small number of radio frequency channels, e.g., one ARFCN (radio frequency channel number) for LTE and one for GSM.

In FIG. 1, device 101 may communicate with radio links 132 and 134 to the fake LTE base station 131 and the fake GSM base station 133, respectively.

Collecting signature components by observing the signals on the links 112, 115, 132, and 134, computing scores based on the signature components, and determining whether communication should proceed with a base station is described below. First normal transitions through communication phases are described using FIG. 2A.

Communication Phases, Usual Scenario

Figure 2A:
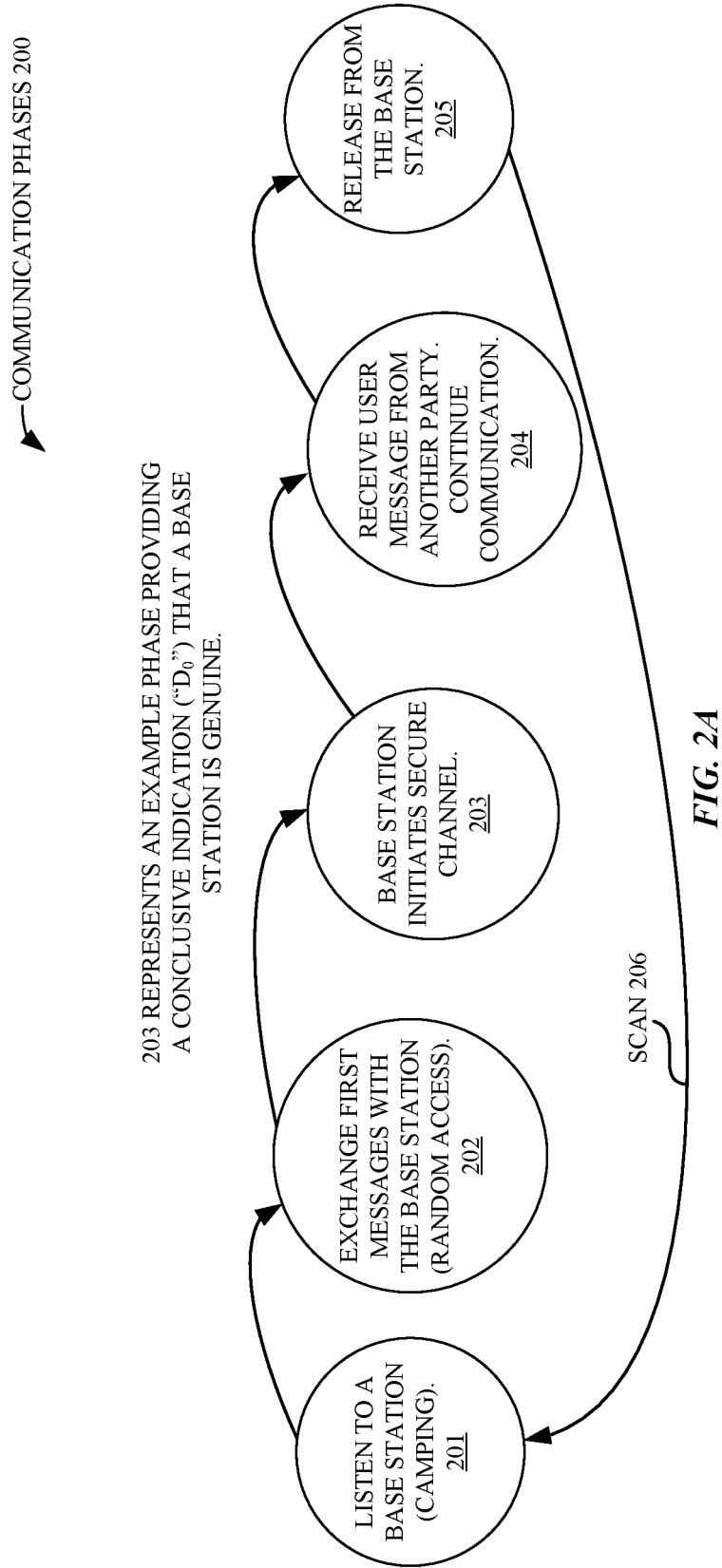
FIG. 2A illustrates exemplary communication phases.

FIG. 2A illustrates exemplary communication phases 200. These phases are labelled and explained to illustrate this application. The phase numbering used here is not precisely used in a standard. These are normal phases of a communication connection between the device 101 and either LTE base station 111 or GSM base station 114. In this application, the device is described as moving from phase to phase. This is not a geographic motion but rather a change of activity or state of the device.

The device, e.g., device 101, monitors a number of base stations to see which one is best for communication; this monitoring is called scanning. A device in a particular geographic area has a list of channel identifiers, called radio frequency numbers or ARFCNs. The device uses the list to check whether it can hear a particular base station transmitting on a particular channel associated with the frequency number. At phase 201, a device is listening to a base station (receiving, but not transmitting). For example, in phase 201, the device may have found the base station through scanning. This kind of listening may be referred to as camping. During camping, a device collects system information broadcast by the base station. In LTE, this system information is in a MIB and SIB s. In GSM the system information is data structures called system information type 1, 2, etc. At phase 202, the device begins a RACH sequence. The base station then learns of the device's presence in the particular geographic area. The base station may begin uplink and/or downlink communication of user data in a phase after 202.

After 202, communication phases 200 includes a phase 203 in which a base station initiates a secure channel (e.g., using MME 107 or AuC 108). Establishment of a secure channel is among a set of signature components that represent what this application refers to as a conclusive indication (denoted $D_0$) that a base station is genuine. There are a number of different categories representing conclusive indications; security establishment is one of them. Faking operator 139 does not have security servers such as MME 107 or AuC 108, and so, communication phases 200, taken as a whole, cannot be completely realized by faking operator 139. For example, faking operator 139 does not have ability to authenticate itself to the device 101 using a shared secret key and also cannot authenticate using a public key infrastructure (PKI) technique. Thus, entering call phase 203 provides a conclusive indication that the base station camped-on at 201 is genuine.

After 203, device 101 receives a user message from another party, for example, device 101 receives the genuine message 106 from the subscriber 104. Subscriber 104 is using the device 103 to send the genuine message 106 to the subscriber 102. In some embodiments, based on the event $D_0$, the device 101 presents the genuine message 106 on a user interface for the benefit of the subscriber 102. After continuing with communication, at some point in time, the device 101 releases from the base station as indicated by phase 205. Release includes moving to an inactive radio resource state (in terms of user communication) and scanning for available base stations, as indicated by scan 206. After scanning, the device 101 may then camp on suitable base station, including LTE base station 111 or possibly fake LTE base station 131. As noted above, fake LTE base station 131 is not able to complete phase 203, so in the event the device camps on the fake LTE base station, the device will not reach phase 204 via phase 203.

LTE Phases, Comparing Genuine and Fake

Figure 2B:
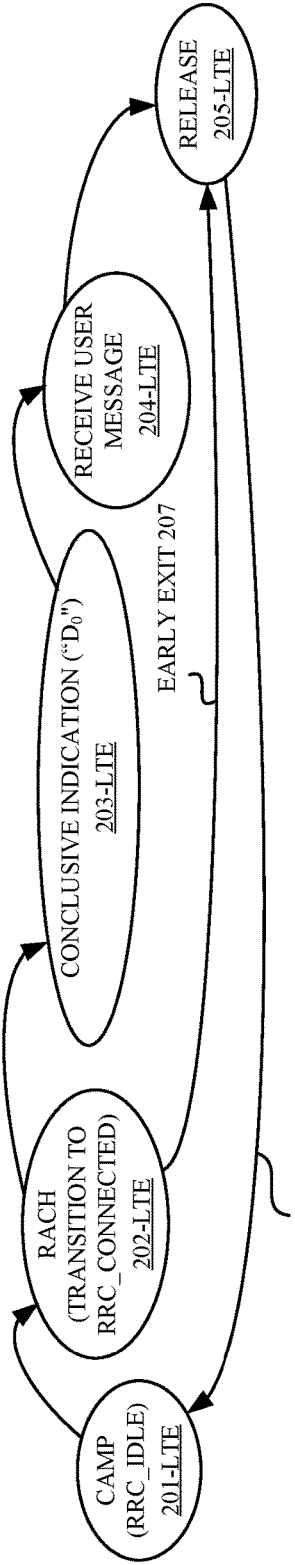
FIG. 2B illustrates exemplary communication phases in an instance of an LTE system.

FIG. 2B illustrates phases similar to those of FIG. 2A. The phases are now identified with the suffix LTE. In FIG. 2B there is the addition of a phase transition path that does not include a conclusive indication; this is the phase transition path is labelled Early Exit 207.

In FIG. 2B, the device 101 has scanned (denoted generically as Scan 206), and camps on an LTE base station at 201-LTE. Scan 206 may also occur during other times, such as approximately during overall intervals when the device is sometimes sending and/or receiving user data. At this point, the device 101 has not determined whether this base station may be fake and should be barred (placed on an untrusted list for a time period). In the example of FIG. 2B, the device 101 is in the RRC_IDLE state of LTE during Scan 206.

In some embodiments, the device 101 calculates a score based on signature components that it has collected, some of which are based on the MIB and SIBs observed at phase 201-LTE. If the score exceeds a fake signature threshold, the device will place an identifier of the base station on an untrusted list for a period of time and return to Scan 206. In the instance illustrated in FIG. 2B, the score is not high enough after phase 201-LTE to classify the LTE base station as fake.

To begin two-way communication, the device 101 performs a RACH sequence at 202-LTE and transitions to the RRC_Connected state of LTE. If the base station is genuine, the device 101 may then move to phase 203-LTE based on observation of a message corresponding to a conclusive indication. This would be the usual next phase.

In an unusual case with a genuine base station, or in any case with a fake base station, the device 101 leaves 202-LTE without reaching 203-LTE. In the example, of FIG. 2B, a phase transition called Early Exit 207 places the device 101 state at Release, denoted 205-LTE. For example, the fake LTE base station 131 may send the device 101 a release message indicating a single ARFCN, the single ARFCN corresponding to the channel on which the fake GSM base station 133 is operating. In some embodiments, the event of observing a system characterized by a single ARFCN is recorded by the device 101 as a signature component that will increase the score being maintained to determine whether a base station is fake. Early Exit 207, by itself, does not categorically indicate that the base station is fake.

For a genuine base station, the device 101 may enter 203-LTE and then proceed to a phase of receiving a user message, denoted in FIG. 2B as 204-LTE. Finally, as in FIG. 2A, after some time the device will release and perform Scan 206.

GSM Phases, Comparing Genuine and Fake

Figure 2C:
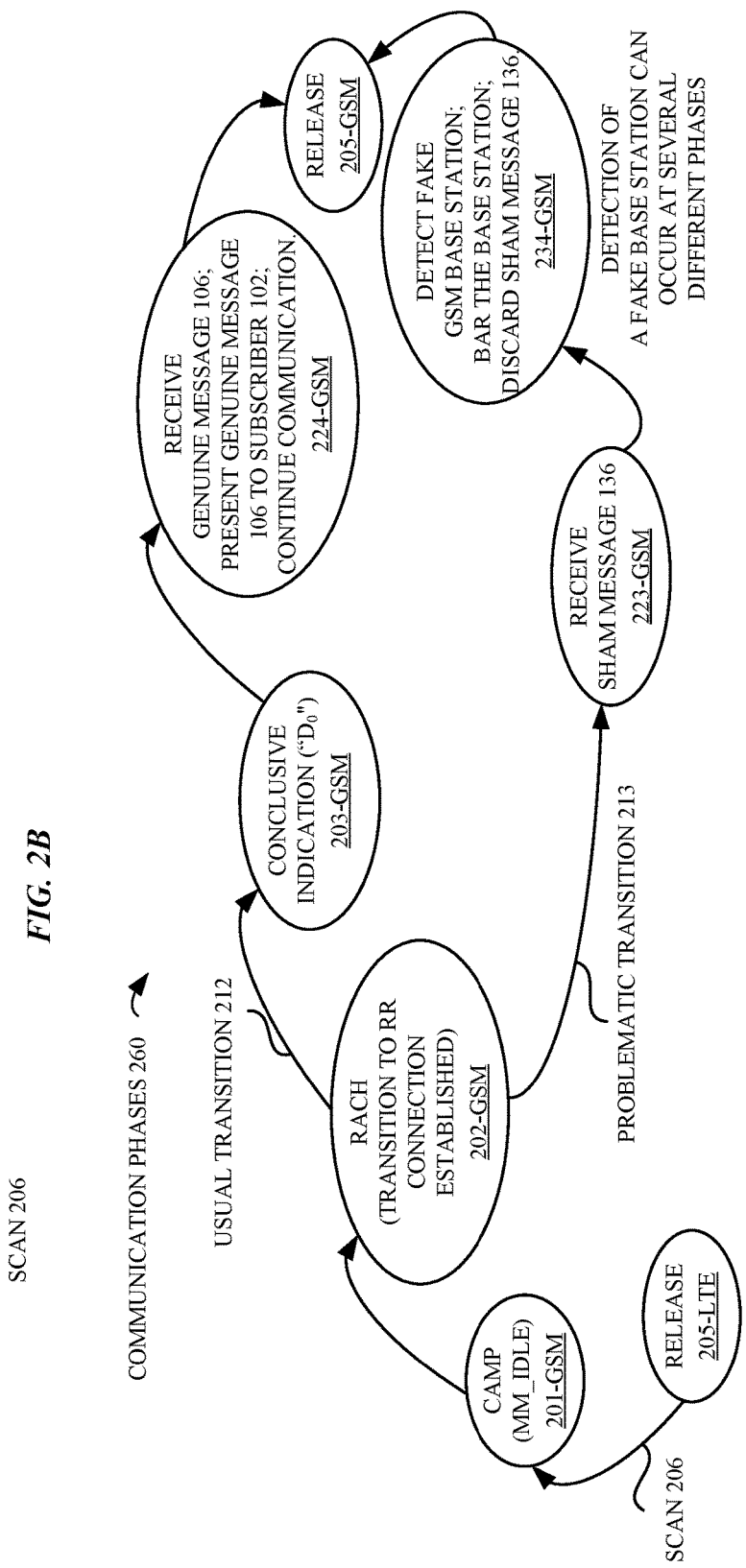
FIG. 2C illustrates exemplary communication phases in an instance of a GSM system, according to some embodiments.

FIG. 2C illustrates communication phases 260 with respect to communication with the GSM base station 114 or with the fake GSM base station 133.

The action begins with release from LTE in the lower left portion of FIG. 2C. This is denoted as Release 205-LTE. The device 101 then performs Scan 206 and camps in MM_IDLE state of GSM at 201-GSM. Upon camping on the new base station, the device 101, in some embodiments, re-initialize to all zeros a bitmask used to gather signature components. In some embodiments, bitmasks related to fake hits (described below) are not reset since faking operator 139 may deploy fake base stations that are cooperatively striving to deliver sham message 136 to the device 101. The device 101 collects system information (SI) type 1, etc., data from the base station. At this point, the device 101 does not know whether this GSM base station that it is camping on should be barred. However, in some embodiments, the device 101 calculates a score based on the collected signature components. Some of the signature components may be based on the system information observed at 201-LTE. Signature components and scoring are described in further detail below. Fake base stations share some characteristics in common with genuine base stations. In order to determine that a base station is likely a fake base station, traits of fake base stations are sought in the collected signature components. When one of these traits is found, this is considered a fake hit. Because there is overlap in the characteristics of fake base stations and genuine base stations, various fake hits are remembered and then analyzed together to determine whether a base station is likely fake.

Example traits of fake base station include: i) a cell selection minimum received signal level much weaker (e.g., 10 dB) than typically observed, ii) observation of a redundant address on a paging channel (e.g., the same address three times in a row), iii) system information indicating that packet data service is not supported, iv) reception of a message rejecting a basic mobile device basic request such as a location area update, v) observation that the base station supports only an extremely low number of radio frequency carriers (e.g., 1), or vi) reception of a date-stamped or time-stamped message with the wrong date or impossible time (e.g., wrong date or time in the future).

After camping in communication phase 201-GSM, the device 101 moves to phase 202-GSM and executes a RACH sequence. In GSM terminology, this is associated with transition to a state with an RR connection established. The GSM base station that device 101 is communicating with in FIG. 2C will transmit messages to device 101 during phase 202-GSM. Based on these messages, the device 101 may make the Usual Transition 212 to the phase 203-GSM associated with a conclusive indication. From the phase 203-GSM, the device may begin to exchange user data as exemplified by the phase 224-GSM. For example, in the phase 224-GSM, the device receives genuine message 106 from the GSM base station 114. The device 101 checks scores including evaluating observation of any conclusive indications. In the example of phase 224-GSM of FIG. 2C, the device determines that the signals are received from a genuine GSM base station and presents the genuine message 106 to the subscriber 102. Subscriber 102 can read the genuine message 106, which originated, e.g., from subscriber 104. After some time, the device 101 transitions to phase 205-GSM, e.g., based on a release message from the GSM base station 114. After release, the device 101 will, in general, actively scan.

Sometimes the device 101 may not make the Usual Transition 212. Faking operator 139, if involved, attempts to steer the device 101 to phase 223-GSM via the Problematic Transition 213. For example, based on communications in phase 202-GSM, the Problematic Transition 213 can include the fake GSM base station sending the sham message 136 to device 101 using, e.g., a GSM SACCH or SDCCH signaling channel. There are many modes in which to transfer an SMS message; different procedures for different modes are mentioned in 3GPP 24.011.

The device 101 then receives the sham message 136 from the fake GSM base station 133. The device 101 checks scores including evaluating observation of any conclusive indications. The device 101 transitions to 234-GSM and performs a fake base station detection based on checking one or more scores. The basis for determining the one or more scores is the signature components collected up to and including the reception of the sham message 136. The scores and bitmasks (collected signature components), in some embodiments, are reset upon entering the phase 201-GSM. Based on determining that no conclusive indications have been observed and based on comparing one or more scores with one or more fake signature thresholds, the device 101 determines that the GSM base station it is communicating with is probably a fake GSM base station. The device 101 then discards the sham message 136 and bars communication with the fake GSM base station for a time period. The device 101 then scans for a new base station to camp on.

Collection of Signature Components, Scoring

Conclusive indications, also called real hits, positively identify the source base station as genuine. If there are no conclusive indications, then a scoring is done, based on signature components, to evaluate whether the base station has an overall signature of a fake base station. Scores are calculated based on signature components in a variety of ways as described herein. A score may be calculated based on a weighted average as described above. In some embodiments, fake hits from a bitmask of fake hits (signature components) are sorted based on whether the fake hit (signature component) is associated with a high weight or with a low weight. The accumulation of fake hits from the bitmask is directed to evaluating whether a base station is probably a fake base station. Genuine base stations are recognized based on conclusive indications, also called real hits.

After recognizing a signature component associated with a particular component label, the signature component may be recorded by changing a bit from "0" to "1" in a bitmask with bit index corresponding to the particular component label. Two methods of scoring are presented herein. In a two-threshold method presented herein, non-zero bits associated with a high weight are summed and compared with a first threshold. If the threshold is not satisfied, all bits in the bit-mask are summed and compared with a second threshold. In a weighted-combination method, a weighted combination is used to obtain a score, which is then compared to a threshold.

Observations of conclusive indications, in some embodiments, are stored in a bitmask of real hits. In some embodiments, the presence of any conclusive indication means that a source base station is genuine. Thus, the bitmask of real hits can be reduced to a single real hit bit by setting the real hit bit to 0 the logical OR of all entries of the bitmask of real hits.

Weighted-Combination Method

Notation is first introduced using the weighted-combination method. The notation format generally also applies to the two-threshold method. In the weighted-combination method, a score, in some embodiments, is calculated by providing a weight to each non-zero bit of a bitmask of false hits and summing the resulting weights. For the sake of illustration, consider a bitmask representing six signature components. Initially the bitmask $C=[n_5 n_4 n_3 n_2 n_1 n_0]$, of wordlength 6 bits, has value $C=[000000]$. After observing the system information, signature components exist at positions 0 and 2-5 and place-holders $n_0$ and $n_2$-$n_5$ are set to 1. An existence of a signature component may also be referred to herein as presence of a signature component. The bitmask then has the value $C=[111101]$. The bitmask C is also referred to herein as storing fake hits. That is, the positions with C correspond to different events that are signature events of a fake base station. These events may also occur with a genuine base station. Detection of a fake base station relies on the number of fake hits being so high that a source of the observed signals, a particular base station, is deemed to be a fake base station with high likelihood.

An association of weights with C may be $W=[w_5, w_4, w_3, w_2, w_1, w_0]$. A score, S, can then be computed as the weighted combination $S=c_5*w_5+c_4*w_4+c_3*w_3+c_2*w_2+c_1*w_1+c_0*w_0$, where "*" and "+" represent usual multiplication and addition operations. For example, if $W=[111222]$ then, in this example, $S=1*1+1*1+1*1+1*2+0*1+1*2=7$. In linear algebra notation this may be expressed as the vector inner product $S=CW^T$ where the superscript T indicates transpose and C and W are row vectors and S is a scalar. In general, S may be a vector with more than one element. The score may then be compared with a weighted fake signature threshold to see if the threshold, e.g., $T_{fake}$, is satisfied. If $S>T_{fake}$ and there are no conclusive indications ($D_0$ observations), then an identifier of the base station is placed on an untrusted list for a period of time, e.g., five minutes. In this example, if $T_{fake}=7$, the query 7>7 returns FALSE, and the device continues to consider the base station for communication. If the threshold is satisfied, the device places an identifier of the base station on an untrusted list and bars communication for a time duration.

Two-Threshold Method

In some embodiments, a first score and a first threshold are used and then depending upon a first outcome, a second score and a second threshold are also used. W is populated with values of "high" and "low" rather than numerical values. Nonzero bitmask entries, also called hits, are examined. The high entries of W are also referred to as high-weight fake hits. The low entries of W are also referred to as low-weight fake hits.

Those fake hits corresponding to the high weight are summed to produce a score $S_{high}$ and compared with a threshold $T_{fakehigh}$. $S_{high}$ may also be referred to as a fake score or a first fake score. If the query $S_{high}>T_{fakehigh}$ returns TRUE, then, if there are no conclusive indications (real hit bit is 0), the base station is placed on the untrusted list for a time. For a numerical example, let $C=[111101]$. Let $W=[low, low, low, high, high, high]$. The number of high hits is two. $S_{high}$ is then 2. If $T_{fakehigh}=2$, then the query $S_{high}>T_{fakehigh}$ evaluates the inequality 2>2 and returns FALSE.

In an instance in which $S_{high}$ does not cross the $T_{fakehigh}$ threshold, a second score, $S_{combined}$, is then considered in which the hit count is accumulated between the low and high-weighted signature components. $S_{combined}$ may also be referred to as a second fake score. In this example, $C=[111101]$. The total hit count is 5. $S_{combined}$ is found as the total hit count, in this example, 5. $S_{combined}$ is then compared with a threshold, let it be denoted $T_{fakecombined}$. If $S_{combined}>T_{fakecombined}$, then the base station is placed on an untrusted list for a period of time. In this example, let $T_{fakecombined}$ be 4. The query 5>4 returns TRUE. If no conclusive indications have been observed, also called real hits, then the base station is classified as very likely being a fake base station. An identifier of the very-likely-fake base station is then placed on an untrusted list for a duration of time, e.g., 5 minutes. Any message received from the untrusted list base station is dropped and not presented to the subscriber 102. A new scan is then performed to identify a new base station to camp on.

In terms of determining whether a base station is probably a fake base station, a high-weight score based on the total number of hits associated with a high weight is compared with a threshold for high weights. If the high-weight score is not high enough to exceed the threshold for high weights, a combined score is calculated. In some embodiments, the combined score is based on the high-weight hit count summed with the low-weight hit count. The combined score is then compared with a threshold for combined weights. If no real hit has occurred (that is, no conclusive indications) and the combined score exceeds the threshold for combined weights, then the base station is barred by placing an identifier of the base station on an untrusted list for a time and dropping any messages from the base station. A scan is then done for a new cell.

Before discussing the signature components in further detail, various logic flows for detecting a fake base station are now described with respect to FIGS. 3A, 3B, 3C, 3D, 3E, 3F, and 3G.

Basic Logic Flow

Figure 3A:
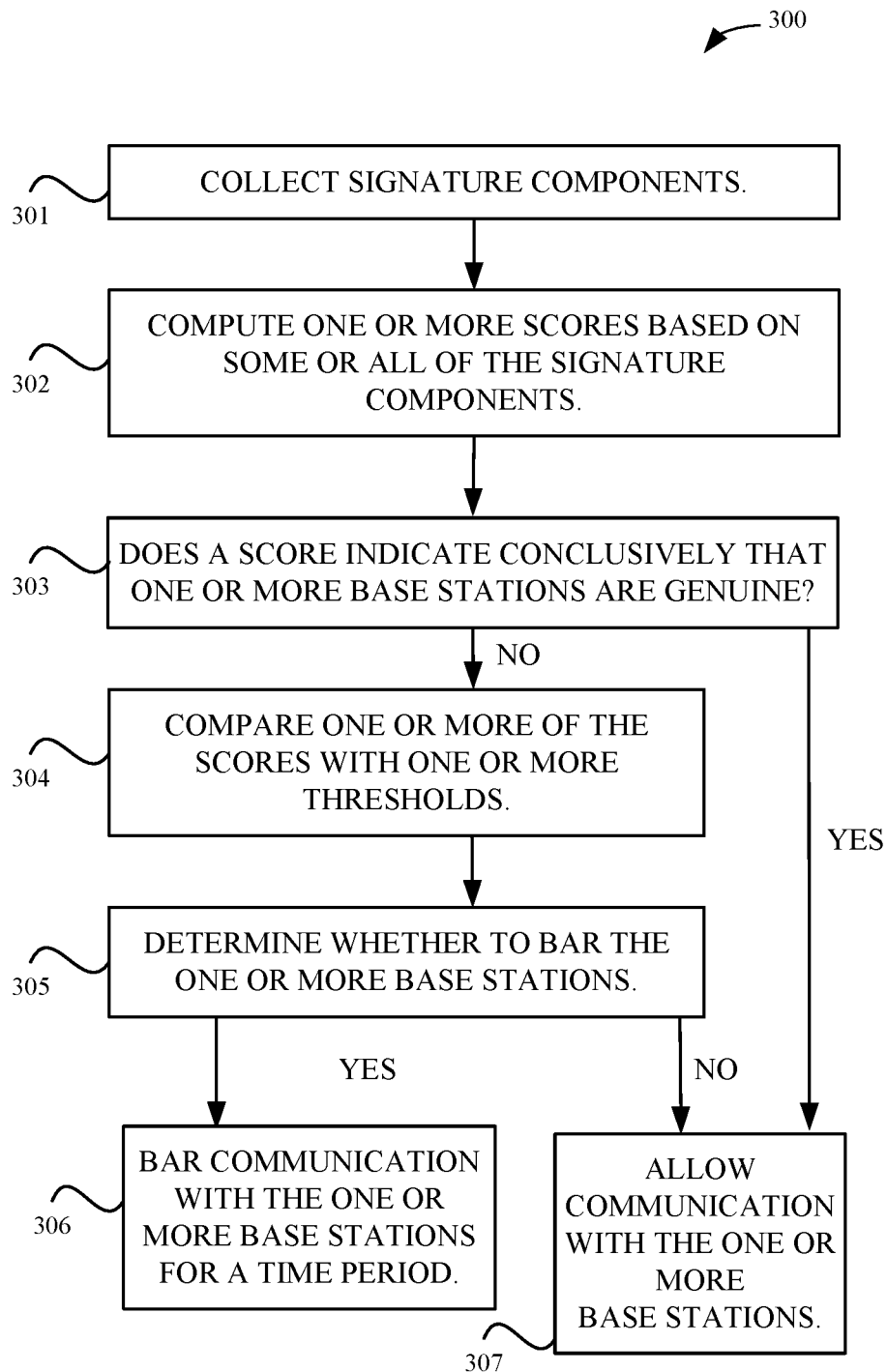
FIG. 3A illustrates exemplary logic for collecting signature components, computing one or more scores, checking for a conclusive indication, comparing with one or more thresholds, and conditionally barring communication with one or more base stations, according to some embodiments.

FIG. 3A provides exemplary logic 300 for detecting a fake base station. At 301, a device collects signature components. The possible signature components include both some associated with a likely fake base station (fake hits) and some associated with a positively genuine base station (real hits). The fake hits are stored in, e.g., a bitmask for fake hits. The real hits can be a stored in a bitmask for real hits. Also, a real hit bit can simply be initialized to zero when the device begins to camp on a new base station and the real hit bit can be set to 1 the first time a real hit occurs.

At 302, the device computes one or more scores based on some or all of the signature components. At 303, the device determines whether a conclusive indication has occurred, e.g., by evaluating whether the real hit bit is 1. If yes, the logic flows to 307 and the device allows communication with one or more base stations. If the real hit bit is not 1 (no conclusive indications), the logic flows to 304. At 304, the device compares one or more of the computed scores with one or more thresholds. Then, at 305, the device determines whether to bar one or more base stations based on the one or more comparisons. If yes, the logic flows to 306 and one or more base stations are barred by the device. In general, barring may be for an indefinite period of time or for a lock-out time configured in the device. The lock-out time, in some embodiments, is five minutes. If no base stations are to be barred, the logic flows to 307 and the device allows communication with the one or more base stations.

Two Fake Signature Threshold Logic

Figure 3B:
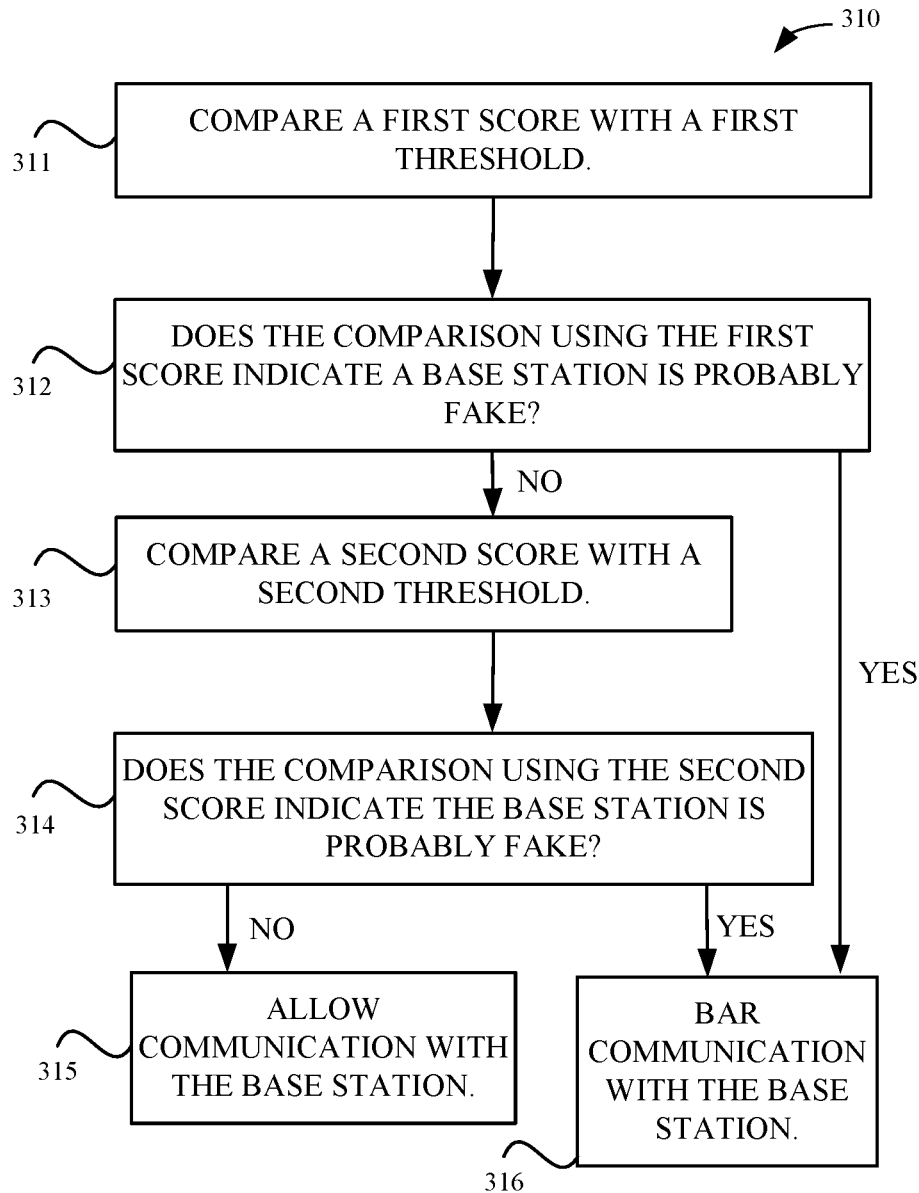
FIG. 3B illustrates exemplary logic for comparing scores with thresholds and conditionally barring communication with a base station, according to some embodiments.

FIG. 3B illustrates exemplary logic 310 for computing two scores to determine whether a base station is likely a fake base station. Logic 310 does not include a conclusive indication aspect. However, logic 310 can be used in conjunction with a conclusive indication aspect as shown in other figures herein.

At 311, the device compares a first score with a first threshold. The first score may be based on a subset of signature components. For example, a subset of the possible kinds of fake hits. At 312, if the first score exceeds the first threshold, the logic flows to 316 and communication with the base station is barred because the base station is probably fake. If no, the logic flows to 313 and a second score is compared with a second threshold. The second score, in some embodiments, is based on a set of all observed fake hits, e.g., including both low-weight fake hits and high-weight fake hits. At 314, if the comparison using the second score indicates that the base station is probably fake, then the logic flows to 316 and the base station is barred. In this application "probably" means with a high likelihood, e.g., a base station characterized by this score is fake with a probability higher than 95%. If no, the logic flows from 314 to 315 and communication with the base station is allowed.

Observation and Score Update Logic

Figure 3C:
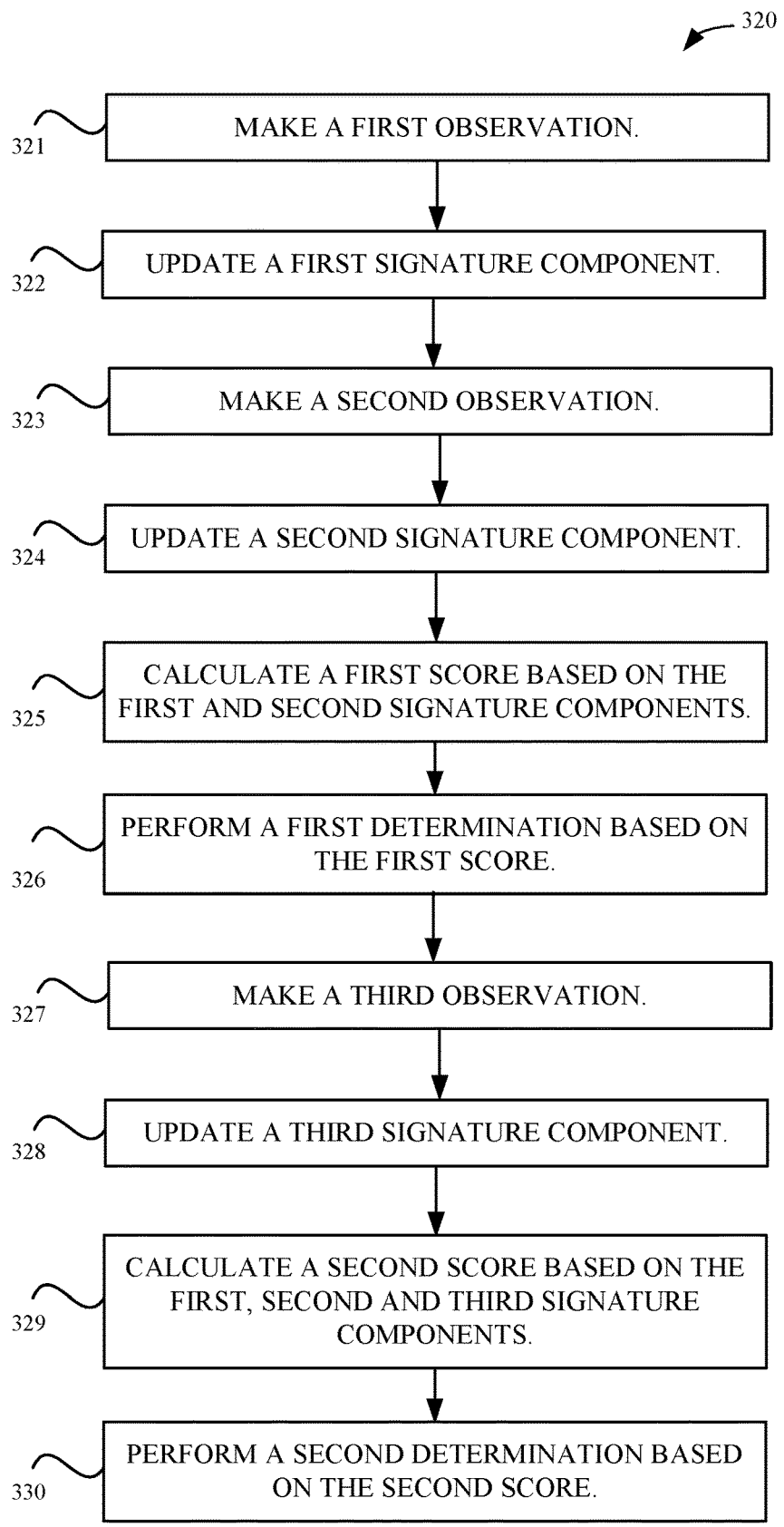
FIG. 3C illustrates exemplary logic for iteratively collecting observations, computing scores, and performing comparisons, according to some embodiments.

FIG. 3C illustrates exemplary logic 320 for collecting observations, calculating scores, and making comparisons. Logic 320 illustrates the on-going nature of collecting signature components, computing scores and evaluating those scores. The scores are useful to detect fake base stations and to prevent sham messages from reaching users (subscribers). The detection of a fake base station, in some embodiments, is attempted at many different communication phases, as will be discussed further below.

With respect to the exemplary logic 320, at 321, a device makes a first observation. The observation in some instances, is based on a value in a field in a system information message, a simple observation that a message was received (also called a message exists or is present in a stream of received messages) or observation of a condition being true. In general an observation may correspond to a fake hit or to a real hit. At 322, the device updates a signature component based on the first observation. In some embodiments, this update is achieved by setting a bit in a bitmask (of fake hits), setting a bit in a bitmask (of real hits) or setting a real hit bit to 1. At 323, the device makes a second observation and at 324 updates a second signature component based on the second observation.

At 325, the device calculates a first score based on the first and second signature components. In general the first score may have more than one component. That is, in this application a score is in general a vector and that vector may have dimension one, two or three. For example, a score may indicate a sum of fake hits and also indicate whether any real hits have been observed. For ease of exposition, generally one, two, or three scalar scores are discussed together: (real hit bit), (fake score, real hit bit), or (first fake score, second fake score, real hit bit). Based on the calculated first score, a base station may be barred (not shown in FIG. 3C). If the device camps on a new base station, in some embodiments, the signature components are reset and the logic would re-start at 321. In the example, of FIG. 3C, the base station is not barred after 326; instead the device makes a third observation at 327. At 328, the device updates a third signature component and at 329 calculates a second score based on the first, second and third observations. The second score, in some embodiments, includes one or more of a real hit bit set to 1, a first fake score and/or a second fake score. At 330, the device examines the second score to determine whether a base station is likely a fake base station, a genuine base station, or make no decision (defaulting toward allowing communication).

Weighted Average Logic

Figure 3D:
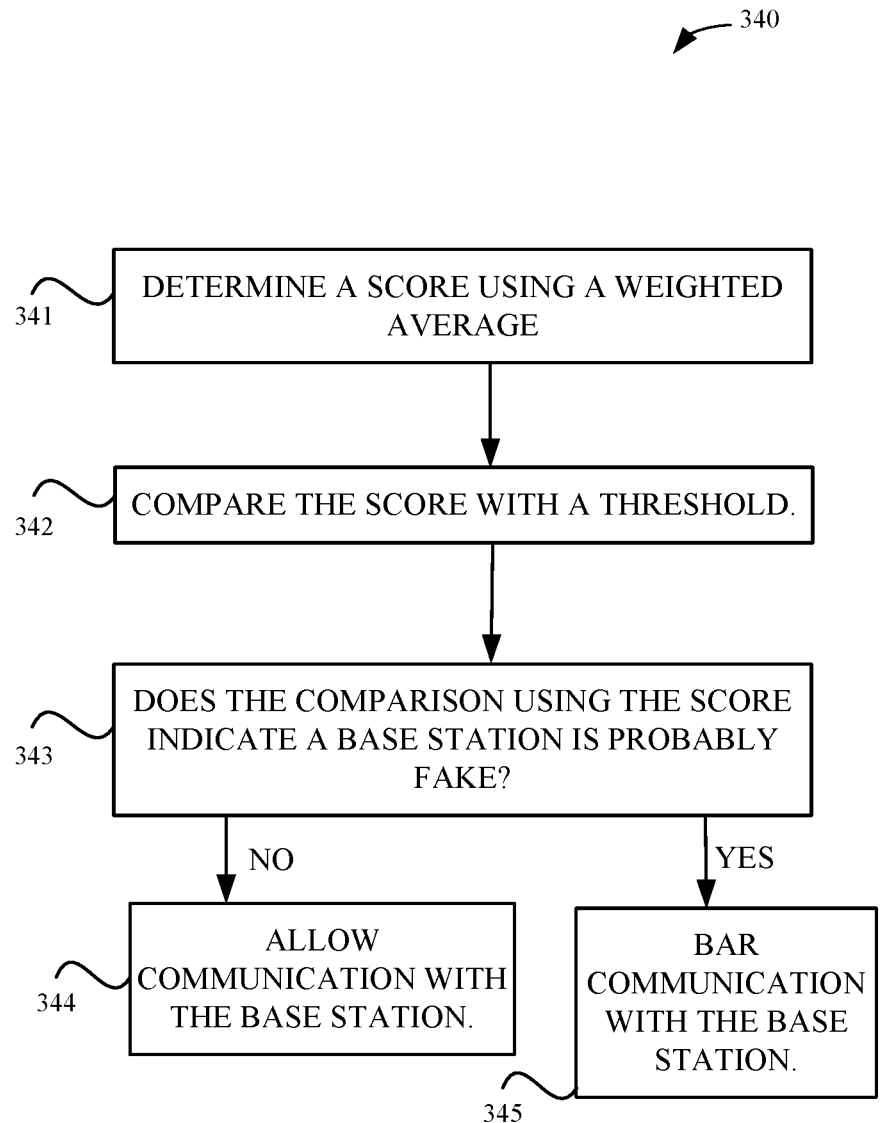
FIG. 3D illustrates exemplary logic for determining a score using a weighted average, comparing with a threshold, and conditionally barring communication with a base station, according to some embodiments.

FIG. 3D provides exemplary logic 340 for computing a single score based on a weighted average and using the score. At 341, a score is determined based on a weighted average. At 342, the score is compared with a threshold. At 343 a determination is made whether the score indicates that base station is likely a fake base station. If yes (and a real hit bit is not set), the logic flows to 345 and the base station is barred. If no, the logic defaults to 344 and communication via the base station is allowed.

Vector Score Logic

Figure 3E:
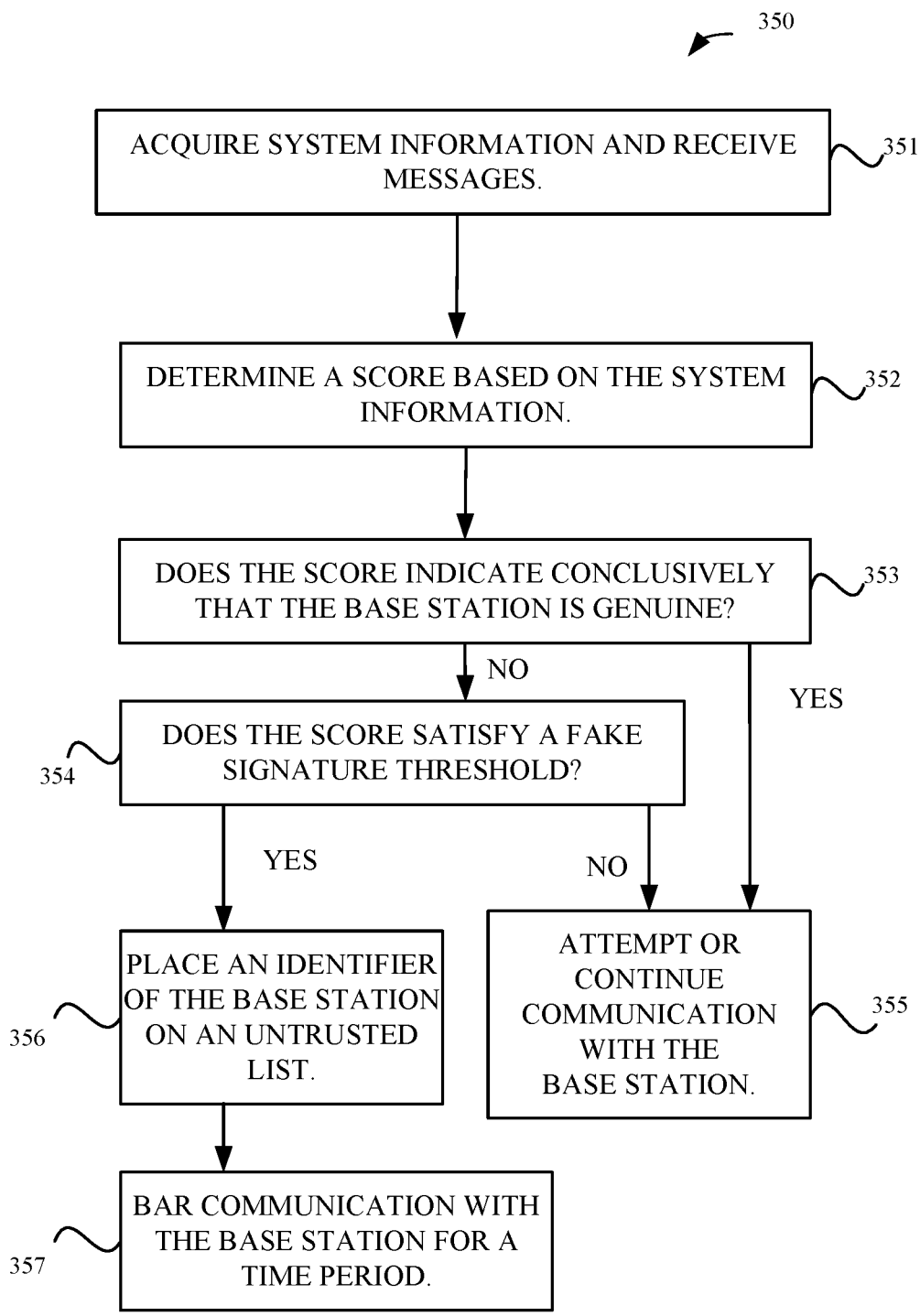
FIG. 3E illustrates exemplary logic for listening to a base station, including determining a score, and comparing the score with a fake signature threshold, according to some embodiments.
Figure 3F:
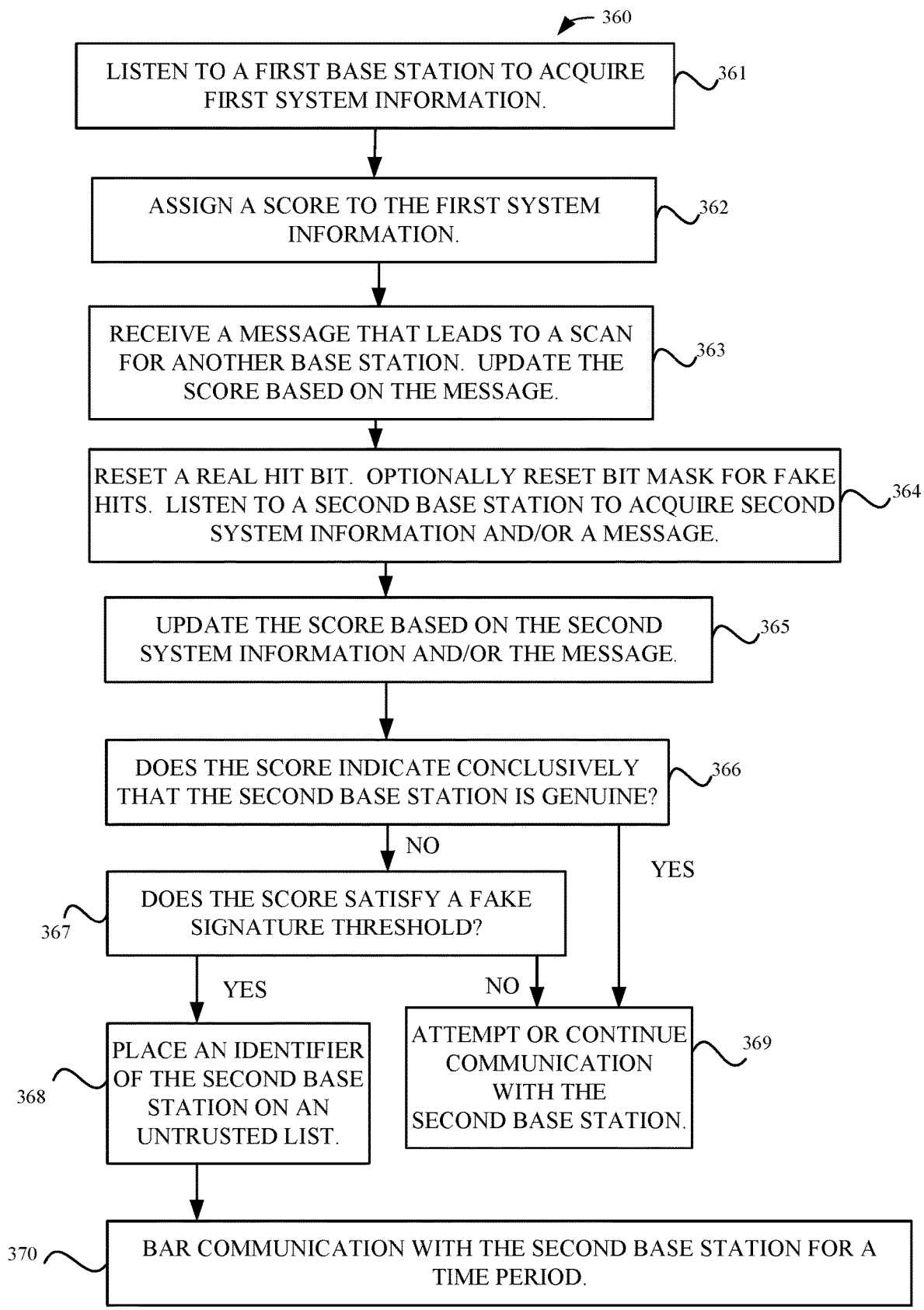
FIG. 3F illustrates exemplary logic including listening to first and second base stations, determining a score, and comparing the score with a fake signature threshold, according to some embodiments.

FIG. 3E illustrates exemplary logic 350 for using a score with more than one element, that is, a score with a vector nature. At 351, a device listens to a base station to acquire system information and communicates with the base station including receiving messages. At 352, the device determines a score based on the system information and messages. In some embodiments, the score includes one or more fake scores and a real hit bit. At 353, the device evaluates whether the score indicates conclusively that the base station is genuine. If yes, the logic flows to 355 and the device attempts or continues communication with the base station. If no, the logic flows by default to 354. At 354, the device determines whether the score satisfies a fake signature threshold. Portions of the logic of FIG. 3B may be used to perform 354. If yes (and the real hit bit is not set), the logic flows to 356 and the device places an identifier of the base station on an untrusted list. The logic then flows from 356 to 357 and the device bars communication with the base station for a time period. If the score does not satisfy one or more fake signature thresholds, then the logic flows from 354 to 355 by default and the device attempts or continues communication with the base station.

Score Over One or Two Base Stations

Logic 360 illustrates exemplary logic 360 in which a score developed with a first base station is updated when listening to a second base station. However, positive indication signature components, such as a real hit bit, are reset when starting with the second base station. At 361, the device listens to a first base station to acquire first system information. At 362, the device assigns a value to a score based on the first system information. At 363, the device receives a message from the first base station that results in the device performing a scan. The device updates the score, if applicable, based on the message. In some embodiments, the score is reset at 364. In some embodiments, the device is no longer concerned with the first base station after the device reaches 364. At 364, the device resets a real hit bit (if at an asserted value) and listens to a second base station to acquire second system information and possibly receive messages. At 365, the device updates the score (including real hit bit, if applicable) based on the second system information and possibly messages. At 366, the device evaluates the score to see if the second base station is genuine. This can be done, for example, by checking whether the real hit bit is set. If yes, the logic flows to 369 and the device attempts or continues communication with the second base station. If no, the logic flows by default to 367. At 367, the score is evaluated to see whether one or more fake signature thresholds are satisfied. The logic of FIG. 3B can be used for 367. If yes, the second base station is barred as shown at 368 and 370. If no, the logic flows by default from 367 to 369 and the device attempts communication or continues communication with the second base station.

In some embodiments, logic 360 is used with the change that, for example, a bitmask used to store signature components associated with fake hits is not reset to zero at 364, and the nature of the first base station (fake/genuine) is evaluated. Then, if a fake signature threshold is satisfied at 367, both the first and the second base station are barred at 368 and 370.

In some embodiments, action to take with a user message received via the second base station is determined based on using a single score for each base station. For example, observations are used to form a single score for the first base station, e.g., a first score computed using the weighted combination method. The second base station is then also characterized using a single score using the weighted combination method to produce a second score. Conclusive indications are first considered for both base stations. If signature components providing conclusive indications for both of the base stations have been observed, then the user message is provided to the user. If the issue of whether both base stations are trustworthy remains in doubt, however, then the first score of the first base station and the second score of the second base station, in some embodiments, are combined in a decision combination. In some embodiments, a decision combination is performed as follows. The first score is individually compared with a first threshold and the second score is individually compared with a second threshold. The scores are also summed and the result of the summation is compared with a composite threshold. Consistent with discussion elsewhere increasing score values indicate more traits of a fake base station observed and so tend to indicate increasing untrustworthiness. The result of the decision combination is decided as follows. If any of the thresholds are satisfied (individual thresholds or composite threshold) then the user message is discarded and the base stations are avoided for a duration of time. If none of the thresholds are exceeded, then the first and second base stations are deemed not untrustworthy and the user message is provided to the user.

Single Base Station, Logic Showing Iteration

Figure 3G:
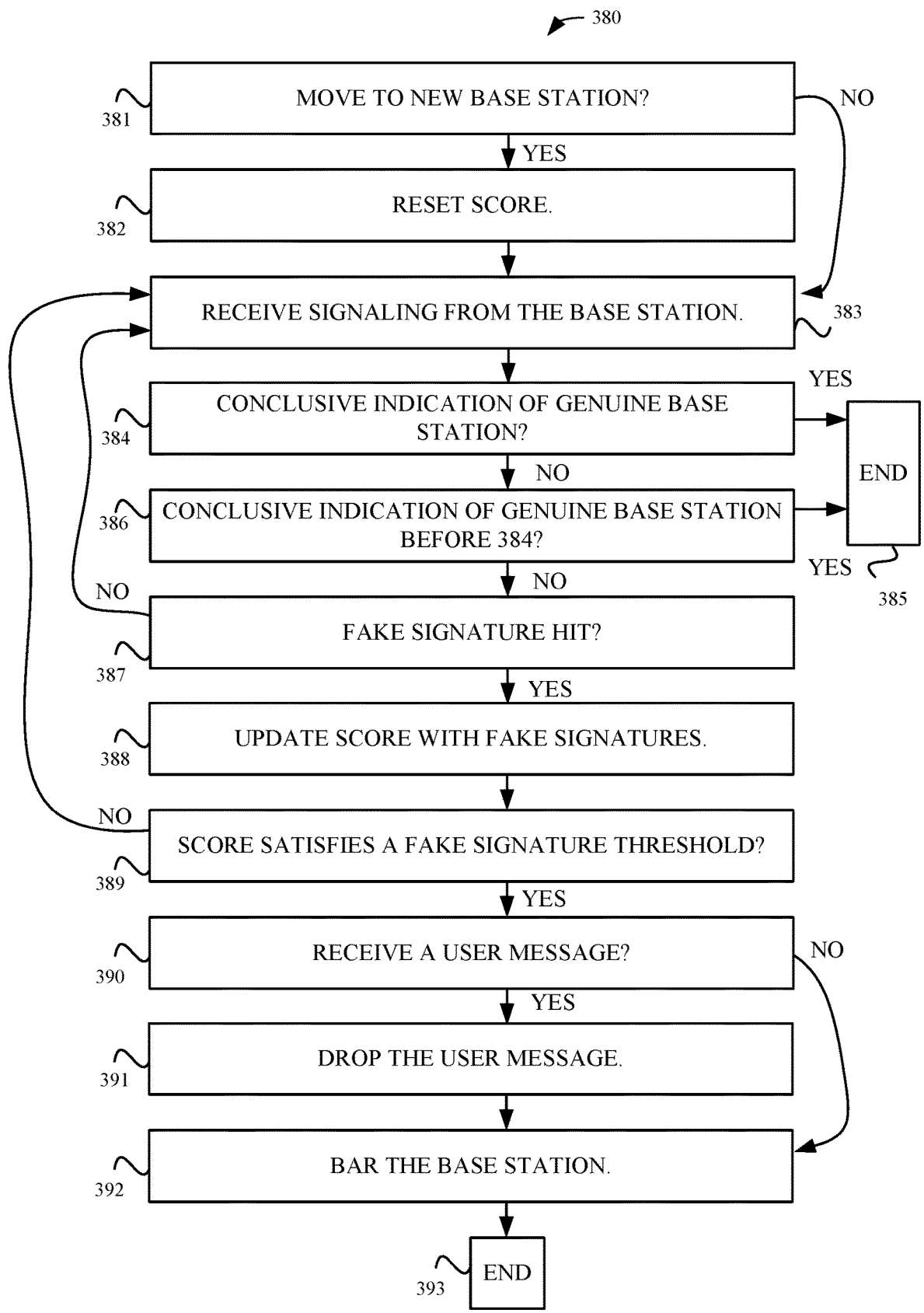
FIG. 3G illustrates exemplary logic including moving to a new base station, updating a score, and dropping a user message if the score exceeds a fake signature threshold, according to some embodiments.

FIG. 3G illustrates logic 380 for detecting a base station including explicit illustration of iteration to receive additional signaling and/or messages from the base station. At 381, a device determines whether it has moved to a new base station. If yes, a score that the device is maintaining is reset. For example a bitmask for fake hits is reset, a bitmask for real hits is reset, and a real hit bit is reset. The logic then flows to 383. If the device had not begun camping on a new base station, the logic flows from 381 and also reaches 383. At 383, the device receives system information and messages (indicated as signaling) from the base station. At 384, the logic determines if the received signaling of 383 indicates the base station is genuine. If yes, the logic flows to 385 and terminates. If no, the logic flows to 386 to determine if a bit has been set in the bitmask for real hits based on events prior to the recent data acquired at 383. If yes, the logic flows to 385. In some embodiments, the logic for the "NO" branch from 384 flows directly to 387 and 386 is omitted.

At 387, the device determines if a fake signature hit occurred in the data acquired at 383. If no, the logic flows to 383 to acquire more data. If yes, the logic flows to 388 to update the score with new fake hits. At 389, the device determines whether a fake signature threshold is satisfied. The logic of FIG. 3B can be used for 389. If no, the logic flows to 383 to acquire more data. If yes, the base station will ultimately be barred. That is, if yes, the logic flows from 389 to 390 to determine if a user message was received, e.g., during 383. If no, the logic flows to 392 and the base station is barred. If yes, the logic flows from 390 to 391 and the message is dropped (not presented to the user of the device), and then the logic flows from 391 to 392 and the base station is barred. The logic is then indicated as terminating at 393. The device will then commence to scan after 392 (not shown in FIG. 3G).

Signature Components, Score Calculations

As discussed above, determining whether a device continues with a base station can depend on conclusive indications, a first score and a second score. The first and second scores are based on fake hits. Messages and system information used in determining conclusive indications and fake hits, in some embodiments, are a function of the RAT of the base station that the device is observing (either collecting system information or sending and receiving messages).

Some conclusive indications are associated with functionality supporting security such as authentication and encryption. In addition, conclusive indications can include functionality related to support of packet data service. Another functional area that contributes to conclusive indications is mobility management within a system, for example, support of handoff to another base station while maintaining a call.

For the LTE RAT, examples of conclusive indications are, but are not limited to, observation of an LTE message accepting an update of a logical group of cells that the device belongs to in the serving network, an LTE message with an integrity-check field that the mobile device is able to verify with an integrity key, or an LTE message via a short message service service center (SMS-SC) coincident with reception of an LTE message routed through a gateway GPRS support node (GGSN).

For the GSM RAT, examples of conclusive indications are, but are not limited to, observation of a GSM message indicating that packet service parameters are available in a system information transmission, or a GSM message providing a second temporary identifier to replace a first temporary identifier in order to protect against the mobile device being identified and located by a malicious party.

As mentioned above, fake hits may be weighted as high or low. The weighting determines how the hits are grouped to calculate scores. Only high weight hits are used to calculate the first score, so the conditions giving rise to high weight hits may be referred to as a first set of conditions. A second score is calculated using both the first and second sets.

Fake hits also generally depend on which RAT is under consideration. Examples of conditions in the first set (high weight) include (but are not limited to): i) observation of LTE system information indicating a cell selection minimum received signal level that is more than 10 dB less than a typical cell selection level, or ii) a paging channel message in which an address value is identical to an address value in an immediately preceding paging channel message. Examples of conditions in the second set (low weight) are observation of LTE system information indicating that mobile originated packet data transmission is not allowed and observation of a message rejecting an attempt by the mobile device to update a logical group of cells that the mobile device is associated with.

Examples of conditions in the first set (high weight) for GSM include (but are not limited to): i) system information indicating a number of radio frequency carriers supported for use by the mobile device in camping on the cell, wherein the number is 1 or 0, or ii) system information indicating that a cell selection minimum received signal level that is more than 10 dB less than a typical cell selection level. Examples of conditions in the second set (low weight) are: i) observation of GSM system information indicating that packet data service is not supported, or ii) a short message service (SMS) message and the message condition checks for a date field including a value that does not correspond to a current date.

For example, in observing a GSM base station, if there are no real hits (conclusive indications), in a two-threshold method, an $S_{high}$ score value is calculated and compared with a $T_{fakehigh}$ threshold value for GSM base stations (calculating a first score using the first set for GSM). If that threshold is not satisfied, an $S_{highcombined}$ score is calculated and compared with a $T_{fakecombined}$ threshold for GSM base stations (calculating a second score using the first set and the second set). If the second threshold is not satisfied, the device defaults to allowing or continuing communication with the GSM base station. As an alternative, a weighted-combination score is calculated, in some embodiments.

Figure 4C:
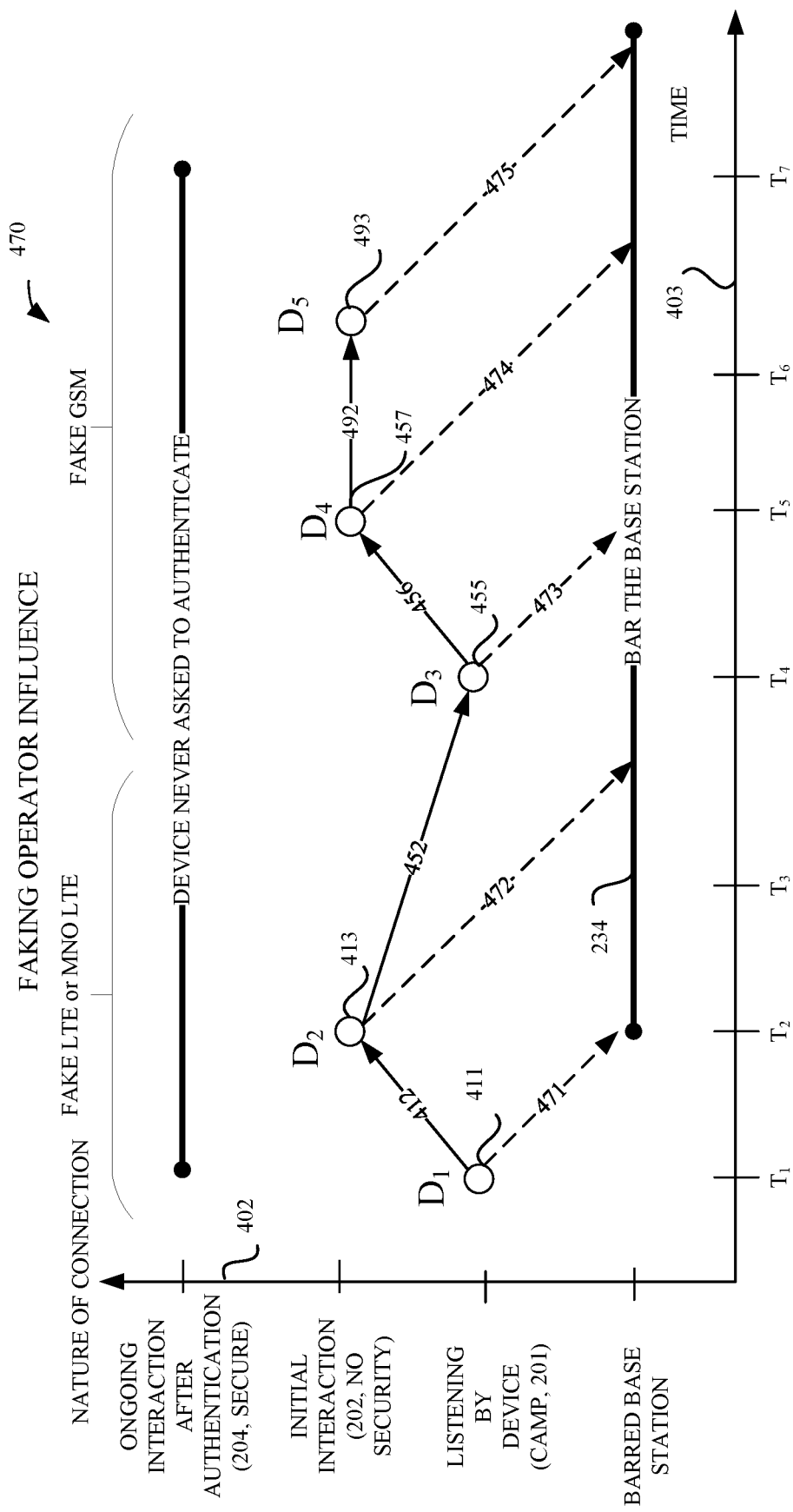
FIG. 4C illustrates exemplary detection opportunities ($D_1, \ldots, D_5$) in a time series of a fake LTE connection followed by a fake GSM connection, according to some embodiments.

Embodiments set forth herein can also be described in specific examples including an aspect of whether a device advances to a call phase with authentication event. FIGS. 4A, 4B, and 4C are formatted to emphasize whether or not a device has been involved in authentication before receiving a user message. Generally, not all conclusive indications relate to authentication.

From the device's point of view, a base station may be fake and the device may be said to maintain a skeptical attitude that the device occasionally checks—however, a base station is always trusted until it's marked as fake. The device evaluates a given base station using one or more of the methods and logic sequences described herein.

Example of LTE Connection with Authentication

The format of FIG. 4A emphasizes that moving from a connection with no security to a connection with security indicates to the device that it is in contact with a genuine base station. In that sense, "up to a high state" is good in FIG. 4A. Specifically, FIG. 4A illustrates a usual case 400 in which the device 101 communicates with LTE base station 111 operated by MNO 109. The horizontal axis 403 is time and the vertical axis 402 represents the nature of the connection between device 101 and the base station. States are indicated by open circles and transitions are indicated by numbered arrows. A precise time scale is not given; the figure illustrates that as time passes events take place and the device learns that the base station is genuine. Differences between one time and another are not meant to correspond to actual times, rather the figure illustrates a sequence of events in time. The device implements one or more of the logic sequences shown in FIGS. 3A, 3B, 3C, 3D, 3E, 3F, and 3G as it collects signature components. Combinations of logic components from these figures are applied, in some embodiments. Application of logic exemplified by the cited figures, by the device, applies in general over time.

In FIG. 4A, the device 101 passes through phases 201, 202, and 204 of FIG. 2A and mutual authentication occurs. In particular, at a time $T_1$, the device is in a state 411 camping on an LTE base station. The usual monitoring of system information occurs. Then the device performs a RACH sequence indicated by the arrow 412 and the state 413. This is an initial interaction, and there is no security. For example, no security challenges have been sent and no challenges have been answered in an AKA process. However, few or no fake hits occur, and the device does not bar the LTE base station.

The base station initiates authentication as indicated by the transition 414 (annotated with a $D_0$) and the state 415. For example, the transition 414 at time $T_2$ to state 415, in some instances, represents a successful AKA process. The base station and the device now trust each other and session keys have been established for ciphering and message integrity checking. Exchange of user data now takes place, beginning at $T_3$ and exemplified by the transition 416 to state 417 at time $T_4$. For example, at time $T_4$ the device 101 receives the genuine message 106 from the LTE base station 111. The conclusive indication, $D_0$, during transition 414 has set the real hit bit, and the device 101 presents the genuine message 106 to the subscriber 102.

Example of LTE Connection Followed by GSM Connection with Authentication

FIG. 4B has a format similar to FIG. 4A and illustrates a case 450 in which the device passes through the phases of FIG. 2A twice. The first time ($T_1$-$T_3$) communicating with the LTE base station 111 and the second time ($T_4$-$T_7$) communicating with the GSM base station 114. State 411 at time $T_1$ and transition 412 are as in FIG. 4A. At time $T_2$, the LTE base station may release the device and the device may then transition via arrow 452 to camp on a GSM base station at time $T_4$. Scan 206 may occur, not shown in FIG. 4B. For this transition sequence of (412, 415) a conclusive indication may not have occurred. Also, no user message has been received.

In some instances, the LTE base station authenticates with the device, as shown with arrow 414 marked $D_0$, starting at $T_2$ and ending at 415 at time $T_3$. The device knows the LTE base station is genuine based on the conclusive indication $D_0$, in this case authentication. Rather than beginning user data exchange, the LTE base station sends a release message and the device transitions from time $T_3$ via the arrow 454 to state 455 at time $T_4$. Again a scan 206 may occur, not shown. The device has camped on a GSM base station.

The device collects system information. In some instances, the system information may bear a conclusive indication (this camping state 455 is marked $D_0$ to indicate this opportunity). For example, in some embodiments, system information packet data support is a conclusive indication that the base station is genuine. After collecting system information and updating signature components, the device then begins a RACH sequence at time $T_4$ and transitions via arrow 456 to the state 457 at time $T_5$, initial interaction, with the GSM base station. The device then receives an authentication request or command from the GSM base station and transitions via the arrow 458, marked $D_0$, to state 459 and time $T_6$. The device knows that the GSM base station is genuine based on the conclusive indication $D_0$ of the authentication request (if it already did not know from system information collected at state 455). User data may then be exchanged as indicated by the transition 460 to the state 461 at time $T_7$. For example, the device may receive and present genuine message 106 to the subscriber 102.

LTE and GSM Connections, Faking Operator Influence

FIG. 4C is similar to FIG. 4B except that the device has camped on the fake LTE base station 131 when the action begins at time $T_1$. The vertical axis 402 is now also marked with a barred connection ordinate. At time $T_1$, the device is camping on an LTE base station. The device collects system information and may determine that the LTE base station is likely a fake LTE base station. This detection opportunity is marked $D_1$. No conclusive indication has occurred and one or more fake hits may occur. The fake hits populate signature component entries, for example in a bitmask for fake hits as discussed above. If the fake hits cause a threshold condition to be satisfied as described, e.g., with respect to FIGS. 3A, 3B, 3C, 3D, 3E, 3F, and 3G, then the nature of the connection moves to barred, shown by a downward dashed line marked 471. Here, moving downward from a camping state indicates a loss of confidence in the LTE base station. The device then scans and camps on another base station (not shown in FIG. 4C).

In some instances, the device 101 has not barred the LTE base station at time $T_1$ and instead transitions with a RACH sequence shown by the transition 412 and the state 413. The messages received from the LTE base station are included in the device signature component collection activity as indicated by the detection opportunity $D_2$. One or more scores are updated and if a fake signature threshold is satisfied, the device moves the connection to a barred state as shown by the dashed arrow 472. No conclusive indication has occurred.

The device may receive a release message or another event can occur to send the device from 413 via the arrow 452 to the state 455 at time $T_4$. If the release message includes only one radio frequency channel number, this is an indication that a GSM base station at the radio frequency channel number may be fake. Such a fake hit, in some embodiments, is not reset to 0 in the bitmask for fake hits C after the transition indicated by the arrow 452. In some instances, the device 101 may camp on LTE base station 111, follow the transitions 412 and 452 and then camp on the fake GSM base station 133 at time $T_4$.

At $T_4$, the device has another detection opportunity, marked $D_3$. Generally, bitmasks are reset and observed signature components are used to populate the bitmasks based on system information collected in state 455. However, an LTE release message steering a device to a single GSM frequency, in some embodiments, is cause to populate a signature component in the bitmask used to evaluate the next base station.

Fake GSM base station 133 is trying to induce 101 to commence communications, for example, using inviting RxLev parameters. If a fake signature threshold is satisfied at state 455, then the GSM base station is barred as indicated by the dashed arrow 473.

In some instances, the number of fake hits is insufficient to cause the bar event and the device transitions via the arrow 456 to the state 457 from time $T_4$ to time $T_5$. This transition may include a RACH sequence. At time $T_5$, the device again collects signature components and updates the bitmask for false hits. No conclusive indications have occurred so a bitmask for real hits remains in the initialized state and a real hit bit, if used, remains in an un-asserted state, for example, with a value of "0" or "FALSE." If a fake signature threshold is satisfied, then the GSM base station is barred by the device as indicated by the dashed arrow 474.

In a normal situation, a GSM base station would proceed to authenticate with the device, for example, as shown by the transition 458 in FIG. 4B. A Problematic Transition 213 is desired by the Faking Operator 139. The fake GSM base station 133 sends the device 101 the sham message 136 as indicated by the transition 492 and arrival of the device at the state 493. The device collects one or more signature components based on this and other messages and updates the bitmask for fake hits. No conclusive indications have occurred, so the real hit bit (or other implementation) does not indicate that the GSM base station is genuine. The device evaluates the signature components, e.g., using the bitmask for fake hits, and with high likelihood, transitions the GSM base station to a barred state as shown by the dashed arrow 475. The device begins a scan to find another base station to camp on (not shown in FIG. 4C). The subscriber 102 is not presented with the sham message 136 and the subscriber 102 is protected from a deception attempted by the faking operator 139.

Exemplary Detection Method

Embodiments provided herein describe a detection method by a mobile device, the method including: when one or more conclusive indications of a genuine nature of a base station have occurred, allowing communication with the base station. On the other hand, when no conclusive indications have occurred, comparing a first score with a first threshold, and when the comparison using the first score indicates a base station is likely fake, barring communication with the base station for a time period. But, when the comparison using the first score does not indicate the base station is likely fake, comparing a second score with a second threshold. When the comparison using the second score indicates the base station is likely fake, barring communication with the base station for the time period. However, when the comparison using the second score does not indicate the base station is likely fake, allowing communication with the base station.

In some embodiments, a conclusive indication comprises: i) observation of a base station message associated with authentication capability or associated with packet data capability, ii) observation of system information indicating the base station has packet data capability, or iii) reception of a command shifting the mobile device to a second base station without interrupting a call.

In some embodiments, a conclusive indication includes observation of one or more of: 1) an LTE message accepting an update of a logical group of base stations that the mobile device belongs to in a serving network, 2) an LTE message with an integrity-check field that the mobile device is able to verify with an integrity key, or 3) an LTE message via an SMS-SC coincident with reception of an LTE message routed through a GGSN.

In some embodiments, the method also includes populating a bitmask of real hits based on the one or more observations. In some embodiments, the method also includes setting a real hit bit to an asserted state if any element of the bitmask of real hits is asserted.

In some embodiments, a conclusive indication includes observation of one or more of: 1) a GSM message indicating that packet service parameters are available in an SI transmission, or 2) a GSM message providing a second temporary identifier to replace a first temporary identifier in order to protect against the mobile device being identified and located by a malicious party.

Detection Method Embodiments with First and Second Sets of Conditions

In some embodiments, the detection method includes receiving system information to produce received system information; applying a first set of conditions to the received system information to produce a first set of satisfied conditions; and determining the first score as a first number of elements in the first set of satisfied conditions.

In some embodiments, the detection method includes receiving system information to produce received system information; applying a first set of conditions to the received system information to produce a first set of satisfied conditions; determining the first score as a first number of elements in the first set of satisfied conditions; applying a second set of conditions to the received system information to produce a second set of satisfied conditions; and determining the second score as the sum of the first number and a second number of elements in the second set of satisfied conditions.

In some embodiments, the first set of conditions includes observation of LTE system information indicating a cell selection minimum received signal level that is more than 10 dB less than a typical cell selection level.

In some embodiments, the second set of conditions includes observation of LTE system information indicating that mobile originated packet data transmission is not allowed.

In some embodiments, the system information is GSM system information and the first set of conditions comprises one or more of: i) a first element testing for system information indicating a number of radio frequency carriers supported for use by the mobile device in camping on the cell, wherein the number is 1 or 0, or ii) a third element testing system information indicating that a cell selection minimum received signal level that is more than 10 dB less than a typical cell selection level. In some embodiments, the second set of conditions includes observation of GSM system information indicating that packet data service is not supported.

In some embodiments, the detection method includes receiving a message from the base station; determining that the message satisfies a message condition; and basing the first score on the determining that the message satisfies the message condition.

In some embodiments the message is LTE message and the message comprises: i) a paging channel message in which an address value is identical to an address value in an immediately preceding paging channel message, and/or ii) a message rejecting an attempt by the mobile device to update a logical group of cells that the mobile device is associated with.

In some embodiments, the message is a GSM SMS message and the message condition checks for a date field including a value that does not correspond to a current date.

Additional Exemplary Methods

Embodiments provided herein describe a method by a mobile device including listening to a base station to acquire first information; and testing the first information to obtain a score. If the score indicates that the base station is not trustworthy, the mobile device places an identifier of the base station on an untrusted list, and discontinues listening to the base station.

In yet another method, a mobile device method includes collecting signature components; computing one or more scores based on the signature components; and determining whether a score indicates conclusively that a base station is genuine. When the score does not indicate conclusively that the base station is genuine, comparing the one or more scores with one or more thresholds to produce a comparison result. Then, when the comparison result indicates that the base station should be barred, the mobile device bars the base station, but when the comparison result does not indicate that the base station should be barred, the mobile device allows communication via the base station.

However, in some embodiments, when the score indicates conclusively that the base station is genuine, the mobile device allows without resort to checking the score.

Two Base Station Method

Yet another method by a mobile device is provided, including method steps of: listening to a first base station to acquire first information; testing the first information to obtain a first score; receiving a first message from the first base station; testing the first message to obtain a second score; listening to a second base station to acquire second information; testing the second information to obtain a third score; receiving a second message from the second base station; testing the second message to obtain a fourth score; receiving a user message from the second base station. When the first score or second score indicate the first base station is trustworthy and the third score or fourth score indicate that the second base station is trustworthy, the mobile device provides the user message to a user of the mobile device. However, when a combination of the first score, the second score, the third score and the fourth score indicates that the first base station or the second base station is untrustworthy, the mobile device discards the user message without presenting it to the user. Also, when a combination of the first score, the second score, the third score and the fourth score does not indicate that the first base station or the second base station is untrustworthy, the mobile device provides the user message to the user of the mobile device.

In another two base station method, a mobile device performs a method including listening to a first base station to acquire first information; and testing the first information to obtain a first score. When the first score indicates that the first base station is not trustworthy, placing an identifier of the first base station on an untrusted list, and discontinuing listening to the first base station. However, when the first score does not indicate that the first base station is not trustworthy, the mobile device then performs steps of receiving a first message from the first base station, wherein the first message includes an identifier of a first frequency channel, listening to a second base station at the first frequency channel to acquire second information, and testing the second information to obtain a second score. When the second score indicates that the second base station is not trustworthy, the mobile device places an identifier of the second base station on the untrusted list, and discontinues listening to the second base station.

The above exemplary methods can be performed by a mobile device comprising a memory and one or more processors, wherein the memory includes instructions to perform the method when executed by a processor of the one or more processors.

Exemplary Mobile Device

An exemplary mobile device is disclosed herein including a memory; and one or more processors, wherein the memory includes instructions that when executed by a processor of the one or more processors cause the mobile device to perform operations. The operations include, when one or more conclusive indications of a genuine nature of a base station have occurred: allowing communication with the base station. However, the operations also include, when no conclusive indications have occurred, comparing a first score with a first threshold. When the comparison using the first score indicates a base station is likely fake: execution of the operations bars communication with the base station for a time period. Otherwise, the mobile device performs operations including comparing a second score with a second threshold. When the comparison using the second score indicates the base station is likely fake, the mobile device bars communication with the base station for the time period. When the comparison using the second score does not indicate the base station is likely fake, the mobile device allows communication with the base station.

A conclusive indication observed the exemplary mobile device can include: i) observation of a base station message associated with authentication capability or associated with packet data capability, or ii) observation of system information indicating the base station has packet data capability.

Also, a conclusive indication can include observation of one or more of: 1) an LTE message indicating a logical group of cells that the UE belongs to in a serving network, 2) an LTE message with an integrity-check field that the UE is able to verify with an integrity key, or 3) an LTE message via a SMS-SC coincident with reception of a message routed through a GGSN.

In addition or in the alternative, a conclusive indication can include observation of one or more of: 1) a GSM message indicating that packet service parameters are available in an SI transmission, or 2) a GSM message providing a second temporary identifier to replace a first temporary identifier in order to protect against the mobile device being identified and located by a malicious party.

In some embodiments of the exemplary mobile device, the operations further include: receiving system information to produce received system information; applying a first set of conditions to the received system information to produce a first set of satisfied conditions; and determining the first score as a first number of elements in the first set of satisfied conditions.

In some embodiments of the exemplary mobile device, the operations further include: applying a second set of conditions to the received system information to produce a second set of satisfied conditions; and determining the second score as the sum of the first number and a second number of elements in the second set of satisfied conditions.

Another Exemplary Mobile Device

Embodiments provided herein describe an exemplary mobile device including means for determining one or more conclusive indications of a genuine nature of a base station. Means are also included for allowing communication with the base station when one or more conclusive indications have occurred. The exemplary mobile device also includes means for comparing a first score with a first threshold when no conclusive indications have occurred. The exemplary mobile device also includes: means for barring communication with the base station for a time period when the comparison using the first score indicates a base station is likely fake. The exemplary mobile device also includes: means for comparing a second score with a second threshold when the comparison using the first score does not indicate the base station is likely fake. The exemplary mobile device also includes: means for barring communication with the base station for the time period when the comparison using the second score indicates the base station is likely fake. The exemplary mobile device also includes: means for allowing communication with the base station when the comparison using the second score does not indicate the base station is likely fake.

Exemplary Non-Transitory Computer Readable Medium

Embodiments provided herein include a computer readable medium storing instructions, that when executed by a processor of one or more processors of a mobile device, cause the mobile device to perform operations comprising: when one or more conclusive indications of a genuine nature of a base station have occurred: allowing communication with the base station. However, the operations include: comparing a first score with a first threshold when no conclusive indications have occurred. The operations also include barring communication with the base station for a time period when the comparison using the first score indicates a base station is likely fake. The operations also include: comparing a second score with a second threshold when the comparison using the first score does not indicate the base station is likely fake. The operations also include barring communication with the base station for the time period when the comparison using the second score indicates the base station is likely fake. Finally, the operations also include: allowing communication with the base station when the comparison using the second score does not indicate the base station is likely fake.

Wireless Devices, General Discussion

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Multiple access schemes can be based on time division, frequency division, and hybrids of these, for example direct sequence spread spectrum code division. When a transmitter has multiple antennas, more than one receiver can be served at the same time based on beamforming if the transmitter has channel state information. When both the transmitter and the receiver have two or more antennas, multiple streams can be sent by the transmitter to the receiver. These streams can be separated at the receiver when channel state information is known with respect to the transmit and receive antennas. Each transmitted stream corresponds to a particular transmit vector based on a decomposition of a joint channel matrix.

Representative Exemplary Apparatus

Figure 5:
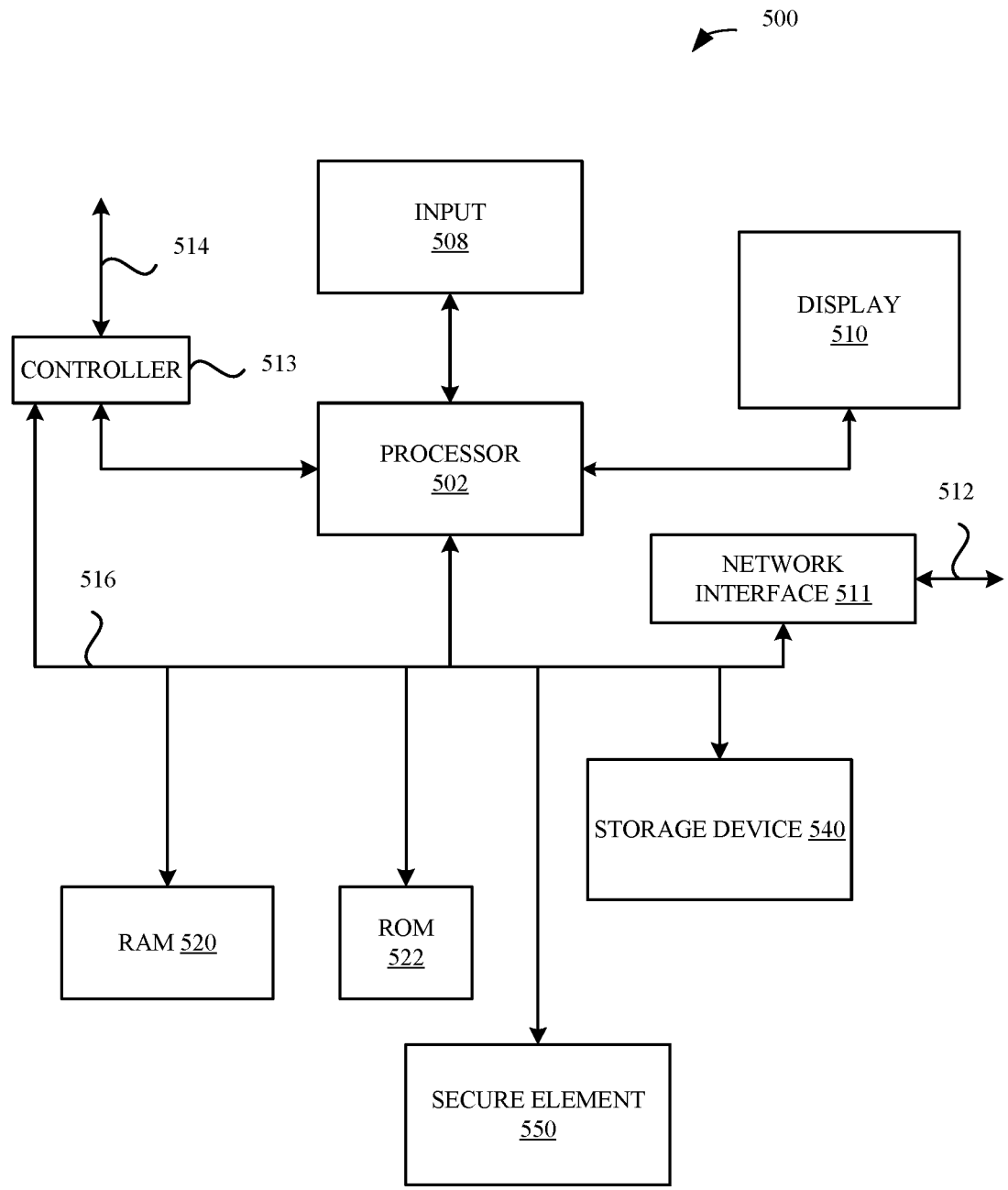
FIG. 5 illustrates an exemplary apparatus for implementation of the embodiments disclosed herein, according to some embodiments.

FIG. 5 illustrates in block diagram format an exemplary computing device 500 that can be used to implement the various components and techniques described herein, according to some embodiments. In particular, the detailed view of the exemplary computing device 500 illustrates various components that can be included in the wireless device 101 illustrated in, e.g., FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user (for example, information relating to incoming, outgoing, or active communication session). A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include wireless circuitry, such as a wireless transceiver and/or baseband processor.

The computing device 500 also includes a storage device 540, which can comprise a single storage or a plurality of storages (e.g., hard drives), and includes a storage management module that manages one or more partitions within the storage device 540. In some embodiments, storage device 540 can include flash memory, semiconductor (solid state) memory or the like. The computing device 500 can also include a Random Access Memory ("RAM") 520 and a Read-Only Memory ("ROM") 522. The ROM 522 can store programs, utilities or processes to be executed in a non-volatile manner. The RAM 520 can provide volatile data storage, and stores instructions related to the operation of the computing device 500.

The computing device 500 also includes a secure element 550. In some embodiments, the secure element 550 is an embedded universal integrated circuit card (eUICC). An eUICC can include one or more electronic subscriber identity modules (eSIMs). An eSIM is a security application associated with a particular MNO. An eSIM can include security materials such as a subscriber key K and over the air (OTA) keys. A subscriber key K can be useful for authentication with the MNO using an authentication and key agreement (AKA) process. In some instances the secure element 550 is a SIM card that executes the security application (including AKA using a subscriber key K).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A mobile device comprising:
   wireless circuitry; and
   at least one processor communicatively coupled to the wireless circuitry and to a memory storing instructions that, when executed on the at least one processor, cause the mobile device to:
   allow communication with a base station after determining one or more conclusive indications that the base station is genuine; and
   bar communication with the base station for a time period after i) determining no conclusive indications that the base station is genuine, and ii) determining occurrence of at least one condition indicating the base station is likely fake,
   wherein the at least one condition includes receiving from the base station at least two consecutive paging channel messages, each paging channel message including identical address values.

2. The mobile device of claim 1, wherein a conclusive indication comprises:
   i) observation of a base station message associated with authentication capability or associated with packet data capability,
   ii) observation of system information indicating the base station has packet data capability, or
   iii) observation of a command shifting the mobile device to a second base station without interrupting a call.

3. The mobile device of claim 1, wherein a conclusive indication includes observation of one or more of:
   1) a 3GPP Long Term Evolution (LTE) message accepting an update of a logical group of base stations that the mobile device belongs to in a serving network,
   2) an LTE message with an integrity-check field that the mobile device is able to verify with an integrity key, or
   3) an LTE message via a short message service (SMS) service center (SMS-SC) coincident with reception of an LTE message routed through a gateway general packet radio service (GPRS) support node (GGSN).

4. The mobile device of claim 1, wherein a conclusive indication includes observation of one or more of:
   1) a Global System for Mobile Communications (GSM) message indicating that packet service parameters are available in a system information (SI) transmission, or
   2) a GSM message providing a second temporary identifier to replace a first temporary identifier in order to protect against the mobile device being identified and located by a malicious party.

5. The mobile device of claim 1, wherein execution of the instructions further cause the mobile device to:
   determine a first score based on one or more traits of a fake base station, wherein the one or more traits of the fake base station include:
   i) a cell selection minimum received signal level that is more than 10 dB less than a previously measured cell selection signal level of a genuine base station,
   ii) system information indicating that packet data service is not supported, or
   iii) reception of a message rejecting a rudimentary request from the mobile device such as a location area update; and
   compare the first score with a first threshold to determine whether the base station is likely fake.

6. The mobile device of claim 5, wherein execution of the instructions further cause the mobile device to:
   compare a second score with a second threshold when the comparison using the first score does not indicate the base station is likely fake; and
   bar communication with the base station for the time period when the comparison using the second score indicates the base station is likely fake.

7. The mobile device of claim 6, wherein:
   the second score is based on one or more traits of a fake base station, and
   the one or more traits of the fake base station include:
   i) observation that the base station supports only one radio frequency carrier, or
   ii) reception of a date-stamped message with a date not matching a current date.

8. The mobile device of claim 5, wherein execution of the instructions further cause the mobile device to:
   receive system information to produce received system information;
   apply a first set of conditions to the received system information to produce a first set of satisfied conditions; and
   determine the first score as a first number of elements in the first set of satisfied conditions.

9. The mobile device of claim 8, wherein the first set of conditions includes observation of 3GPP Long Term Evolution (LTE) system information indicating a cell selection minimum received signal level that is more than 10 dB less than a previously measured cell selection signal level of a genuine base station.

10. A method comprising:
by a mobile device:
determining a first signature component associated with a first base station;
determining a first score associated with the first base station;
determining a second signature component associated with a second base station;
determining a second score associated with the second base station;
receiving a user message from the second base station;
when the first signature component indicates the first base station is trustworthy and the second signature component indicates that the second base station is trustworthy, providing the user message to a user of the mobile device;
when a combination based at least in part on the first score and the second score indicates that the first base station or the second base station is untrustworthy, discarding the user message; and
when the combination does not indicate that the first base station or the second base station is untrustworthy, providing the user message to the user of the mobile device.

11. The method of claim 10, wherein the first signature component comprises:
i) observation of a base station message associated with authentication capability or associated with packet data capability,
ii) observation of system information indicating the first base station has packet data capability, or
iii) observation of a command shifting the mobile device to the second base station without interrupting a call.

12. The method of claim 10, wherein the first score and the second score are based on one or more traits of a fake base station.

13. The method of claim 12, wherein the one or more traits of a fake base station include:
i) a cell selection minimum received signal level that is more than 10 dB less than a previously measured cell selection signal level of a genuine base station,
ii) observation of a redundant address on a paging channel,
iii) system information indicating that packet data service is not supported,
iv) reception of a message rejecting an attempt by the mobile device to update a logical group of cells that the mobile device is associated with,
v) observation that only one radio frequency carrier is supported, or
vi) reception of a date-stamped message with a date not matching a current date.

14. A mobile device comprising:
wireless circuitry; and
at least one processor communicatively coupled to the wireless circuitry and to a memory storing instructions that, when executed on the at least one processor, cause the mobile device to:
listen to a first base station to acquire first information;
test the first information to obtain a first score;
when the first score indicates that the first base station is not trustworthy:
place an identifier of the first base station on an untrusted list, and
discontinue listening to the first base station;
when the first score does not indicate that the first base station is not trustworthy:
receive a first message from the first base station, wherein the first message includes an identifier of a first frequency channel, and
listen to a second base station at the first frequency channel to acquire second information,
wherein the first score indicates that the first base station is not trustworthy based on observing a redundant address in consecutive paging messages received on a paging channel.

15. The mobile device of claim 14, wherein execution of the instructions further cause the mobile device to:
after listening to the second base station:
test the second information to obtain a second score;
receive a user message from the second base station;
when the second score indicates that the second base station is not trustworthy:
place an identifier of the second base station on the untrusted list,
discard the user message, and
discontinue listening to the second base station; and
when the second score does not indicate that the second base station is not trustworthy:
provide the user message to a user of the mobile device.

16. The mobile device of claim 15, wherein the first score and the second score are based on one or more traits of a fake base station.

17. The mobile device of claim 16, wherein the one or more traits of a fake base station include:
i) a cell selection minimum received signal level that is more than 10 dB less than a previously measured cell selection signal level of a genuine base station,
ii) system information indicating that packet data service is not supported,
iii) reception of a message rejecting an attempt by the mobile device to update a logical group of cells that the mobile device is associated with,
iv) observation that only one radio frequency carrier is supported, or
v) reception of a date-stamped message with a date not matching a current date.

* * * * *